United States Patent
McKenney

(10) Patent No.: US 8,924,655 B2
(45) Date of Patent: Dec. 30, 2014

(54) IN-KERNEL SRCU IMPLEMENTATION WITH REDUCED OS JITTER

(71) Applicant: International Business Machines Corporation, Armonk, NY (US)

(72) Inventor: Paul E. McKenney, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 13/758,371

(22) Filed: Feb. 4, 2013

(65) Prior Publication Data

US 2014/0223119 A1    Aug. 7, 2014

(51) Int. Cl.
G06F 12/00 (2006.01)
G06F 12/16 (2006.01)

(52) U.S. Cl.
CPC .................................... G06F 12/16 (2013.01)
USPC ........................... 711/150; 711/156; 711/168

(58) Field of Classification Search
USPC ......................................... 711/150, 156, 168
See application file for complete search history.

(56) References Cited

U.S. PATENT DOCUMENTS

| | | | |
|---|---|---|---|
| 5,442,758 A | 8/1995 | Slingwine et al. |
| 5,608,893 A | 3/1997 | Slingwine et al. |
| 5,727,209 A | 3/1998 | Slingwine et al. |
| 6,219,690 B1 | 4/2001 | Slingwine et al. |
| 6,662,184 B1 | 12/2003 | Friedberg |
| 6,886,162 B1 | 4/2005 | McKenney |
| 6,996,812 B2 | 2/2006 | McKenney |
| 7,191,272 B2 | 3/2007 | McKenney |
| 7,287,135 B2 | 10/2007 | McKenney et al. |
| 7,349,926 B2 | 3/2008 | McKenney et al. |
| 7,353,346 B2 | 4/2008 | McKenney et al. |
| 7,395,263 B2 | 7/2008 | McKenney |
| 7,395,383 B2 | 7/2008 | McKenney |
| 7,426,511 B2 | 9/2008 | McKenney |
| 7,454,581 B2 | 11/2008 | McKenney et al. |
| 7,472,228 B2 | 12/2008 | McKenney et al. |

(Continued)

FOREIGN PATENT DOCUMENTS

EP    1318460 A2    6/2003

OTHER PUBLICATIONS

J. Seigh, "RCU + SMR for preemptive kernel/user threads," Linux Kernel Mailing List, May 9, 2005, 2 pages.

(Continued)

*Primary Examiner* — Gurtej Bansal
(74) *Attorney, Agent, or Firm* — Walter W. Duft

(57) ABSTRACT

A technique for implementing SRCU with reduced OS jitter may include: (1) providing a pair of critical section counters for each CPU; (2) when entering an SRCU read-side critical section, incrementing one of the critical section counters associated with a first grace period; (3) when exiting an SRCU read-side critical section, decrementing one of the critical section counters associated with the first grace period; (4) when performing a data update, initiating the second grace period and performing a counter summation operation that sums the critical section counters associated with the first grace period to generate a critical section counter sum; (5) storing a snapshot value for each critical section counter during the summing; and (6) if the critical section counter sum indicates there are no active SRCU read-side critical sections for the first grace period, rechecking by comparing the snapshot values to current values of the critical section counters.

20 Claims, 18 Drawing Sheets

(56) References Cited

U.S. PATENT DOCUMENTS

| | | | |
|---|---|---|---|
| 7,653,791 | B2 | 1/2010 | McKenney |
| 7,668,851 | B2 | 2/2010 | Triplett |
| 7,689,789 | B2 | 3/2010 | McKenney et al. |
| 7,734,879 | B2 | 6/2010 | McKenney et al. |
| 7,734,881 | B2 | 6/2010 | McKenney et al. |
| 7,747,805 | B2 | 6/2010 | McKenney |
| 7,814,082 | B2 | 10/2010 | McKenney |
| 7,818,306 | B2 | 10/2010 | McKenney et al. |
| 7,873,612 | B2 | 1/2011 | McKenney et al. |
| 7,904,436 | B2 | 3/2011 | McKenney |
| 7,934,062 | B2 | 4/2011 | McKenney et al. |
| 7,953,708 | B2 | 5/2011 | McKenney et al. |
| 7,953,778 | B2 | 5/2011 | McKenney et al. |
| 7,987,166 | B2 | 7/2011 | McKenney et al. |
| 8,020,160 | B2 | 9/2011 | McKenney |
| 8,055,860 | B2 | 11/2011 | McKenney et al. |
| 8,055,918 | B2 | 11/2011 | McKenney et al. |
| 8,108,696 | B2 | 1/2012 | Triplett |
| 8,126,843 | B2 | 2/2012 | McKenney et al. |
| 8,176,489 | B2 | 5/2012 | Bauer et al. |
| 8,185,704 | B2 | 5/2012 | McKenney et al. |
| 8,195,893 | B2 | 6/2012 | Triplett |
| 8,307,173 | B2 | 11/2012 | McKenney |
| 2006/0112121 | A1 | 5/2006 | McKenney et al. |
| 2006/0265373 | A1 | 11/2006 | McKenney et al. |
| 2008/0082532 | A1* | 4/2008 | McKenney .................. 707/8 |
| 2008/0313238 | A1 | 12/2008 | McKenney et al. |
| 2009/0006403 | A1 | 1/2009 | McKenney |
| 2009/0077080 | A1 | 3/2009 | McKenney |
| 2009/0320030 | A1 | 12/2009 | Ogasawara |
| 2010/0115332 | A1 | 5/2010 | Zheng et al. |
| 2011/0283082 | A1 | 11/2011 | McKenney et al. |
| 2011/0321005 | A1 | 12/2011 | Lain |
| 2012/0047140 | A1 | 2/2012 | McKenney et al. |
| 2012/0079301 | A1 | 3/2012 | McKenney |

OTHER PUBLICATIONS

M. Michael, "Hazard Pointers: Safe Memory Reclamation for Lock-Free Objects," IEEE Transactions on Parallel and Distributed Systems, Jun. 2004, vol. 15, No. 6, pp. 491-504.
D. Sarma et al, "Making RCU Safe for Deep Sub-Millisecond Response Realtime Applications," 2004 USENIX (UseLinux track) Jun. 2004, 9 pages.
P. McKenney, "RCU vs. Locking Performance on Different CPUs," 2004 Linux.conf.au, 2004, 18 pages.
P. McKenney et al., "Scaling dcache with RCU," Linux Journal, Jan. 1, 2004, 12 pages.
P. McKenney et al., "Using RCU in the Linux 2.5 Kernel," Linux Journal, Oct. 1, 2003, 11 pages.
P. McKenney et al.,"Read-Copy Update," 2002 Ottawa Linux Symposium, Jul. 8, 2002, 32 pages.
H. Lindar et al., "Scalability of the Directory Entry Cache," 2002 Ottawa Linux Symposium, Jun. 26, 2002, pp. 289-300.
P. McKenney et al., "Read-Copy Update," 2001 Ottawa Linux symposium, Jul. 2001, 22 pages.
P. McKenney et al., "Read-Copy Update: Using Execution History to Solve Concurrency Problems," PDCS, Oct. 1998, 11 pages.
S. Dietrich et al., "Evolution of Real-Time Linux," 7th RTL Workshop, Nov. 17, 2005, 18 pages.
B. Gamsa, "Tornado: Maximizing Locality and Concurrency in a Shared Memory Multiprocessor Operating System," 1999, 14 pages.
Molnar et al., "Realtime and Linux," 2005 Linux Kernel Summit, 8 pages.
H. Boehm, "The Space Cost of Lazy Reference Counting," ACM SIGPLAN Notices, Proceedings of the 31st ACM SIGPLAN-SIGACT Symposium on Principles of Programming Languages, POPL '04, vol. 39, Issue 1, Jan. 2004, p. 210-219.
M. Michael, "Scalable Lock-Free Dynamic Memory Allocation," ACM SIGPLAN Notices, Proceedings of the ACM SIGPLAN 2004 Conference on Programming Language Design and Implementation; PLDI '04, vol. 39, Issue 6, Jun. 2004, p. 35-46.
D. Dice et al., "Mostly Lock-Free Malloc," ACM SIGPLAN Notices, Proceedings of the 3rd International Symposium on Memory Management, ISMM '02, vol. 38, Issue 2 Supplement, Jun. 2002, p. 163-174.
J. Corbet, "Read-copy-update for realtime," LWN.net, Sep. 26, 2006, 3 pages.
McKenney, "Seven real-time Linux approaches (Part C)", LinuxDevices.com, Jun. 7, 2005, 13 pages.
P. McKenney, "RCU and CONFIG_PREEMPT_RT progress," Linux Kernel Mailing List, May 9, 2005, 2 pages.
O. Nesterov, QRCU: 'Quick' SRCU Implementation, Linux Kernel Mailing List, Dec. 1, 2005, 3 pages.
P. McKenney, "Sleepable RCU", LWN.net, Oct. 9, 2006, 10 pages.
P. McKenney, "Read-Copy Update Implementations", 2001, 3 pages.
M. Herlihy, "A Methodology for Implementing Highly Concurrent Data Objects," ACM Transactions on Programming Languages and Systems, vol. 15, Issue 5, Nov. 1993, pp. 745-770.
M. Michael, "Safe Memory Reclamation for Dynamic Lock-Free Objects Using Atomic Reads and Writes," Proceedings of the 21st Annual ACM Symposium on Principles of Distributed Computing, Jul. 2002, 10 pages.
N. Barghouti et al., "Concurrency Control in Advanced Database Operations," Jan. 1994, 83 pages.
P. McKenney, "Exploiting Deferred Destruction: An Analysis of Read-Copy-Update Techniques in Operating System Kernels," OGI School of School of Science & Engineering at Oregon Health & Science University, Jul. 2004, pp. 1-380.
P. McKenney et al., "Extending RCU for Realtime and Embedded Workloads," 2006 Ottawa Linux Symposium, Aug. 11, 2006, 15 pages.
P. McKenney, "The design of preemptible read-copy-update," LWN.net, Oct. 8, 2007, 27 pages.
P. McKenney, "Integrating and Validating dynticks and Preemptible RCU," LWN.net, Apr. 22, 2008, 19 pages.
P. McKenney, "Hierarchical RCU," LWN.net, Nov. 4, 2008, 19 pages.
P. McKenney, "Is Parallel Programming Hard, and, If So, What Can You Do About It", Mar. 8, 2009, 146 pages.
P. McKenney, "Priority-Boosting RCU Read-Side Critical Sections," LWN.net, Feb. 5, 2007, 15 pages.
P. McKenney et al., "Towards hard realtime response from the Linux kernel on SMP hardware," linux.conf.au, Canberra, Australia, Apr. 2005, 16 pages.
P. McKenney et al., "Exploiting Deferred Destruction: An Analysis of Read-Copy-Update Techniques in Operating System Kernels", Jan. 3, 2005, pp. 1-41.
D. Guniguntala et al., "The read-copy-update mechanism for supporting real-time applications on shared-memory multiprocessor systems with Linux", IBM Systems Journal vol. 47 No. 2, 2008, pp. 221-236.
P. McKenney, "Introducing Technology Into Linux", 2008 Linux Developer Symposium, China, 2008, 47 pages.
P. McKenney, "Simplicity Through Optimization", linux.conf.au, Jan. 2010, 109 pages.
P. McKenney, "Deterministic Synchronization in Multicore Systems: The Role of RCU", Aug. 18, 2009, pp. 1-9.
P. McKenney, "RCU cleanups and simplified preemptable RCU", LKML.org, Jul. 23, 2009, 1 page.
P. McKenney, "Expedited "big hammer" RCU grace periods", LKML.org, Jun. 25, 2009, 2 pages.
P. McKenney, "RCU: The Bloatwatch Edition", LWN.net, Mar. 17, 2009, 9 pages.
M. Desnoyers, "Low-Impact Operating System Tracing", University of Montreal, PhD Thesis, Dec. 2009, 233 pages.
P. McKenney, "Using a Malicious User-Level RCU to Torture RCU-Based Algorithms", linux.conf.au, Jan. 2009, 51 pages.
P. McKenney et al., "Introducing Technology Into the Linux Kernel: A Case Study", Operating Systems Review, Jul. 2008, 16 pages.
P. McKenney, "What is RCU, Fundamentally", LWN.net, Dec. 17, 2007, 15 pages.
P. McKenney, What is RCU? Part 2: Usage, LWN.net,Dec. 24, 2007, 15 pages.

(56) References Cited

OTHER PUBLICATIONS

P. McKenney, RCU part 3: the RCU API, LWN.net, Jan. 7, 2008, 7 pages.
T. Hart et al., "Performance of memory reclamation for lockless synchronization", Journal of Parallel and Distributed Computing, Dec. 2007, pp. 1270-1285.
McKenney, "Using Promela and Spin to verify parallel algorithms", LWN.net, Aug. 1, 2007, 11 pages.
McKenney, "RCU and Unloadable Modules", LWN.net, Jan. 14, 2007, 4 pages.
P. Zijlstra, "[PATCH] slab: document SLAB_DESTROY_BY_RCU", LKML.org, Nov. 13, 2008, 1 page.
A. Arcangeli et al., "Using Read-Copy-Update Techniques for System V IPC in the Linux 2.5 Kernel," 2003 FREENIX, Jun. 14, 2003, 13 pages.
P. McKenney, "The RCU API, 2010 Edition", LWN.net, Dec. 8, 2010, 11 pages.
M. Desnoyers et al., "User-Level Implementations of Read-Copy Update", IEEE Transactions on Parallel and Distributed Systems, vol. x, No. y, Jul. 2009, pp. 1-14.
J. Triplett, "Scalable Concurrent Hash Tables via Relativistic Programming", ACM-SIGOPS Operating System Review vol. 44, Issue 3, Jul. 2010, 14 pages.
T. Gleixner, High Resolution Timers / Dynamic Tics—V2, LWN.net, Oct. 31, 2006, 5 pages.
D. Brodkowski, "Re: A few questions and issues with dynticks, NOHZ and powertop", Apr. 6, 2010, see <http://linux.derkeiler.com/Mailing-Lists/Kernel/2010-04/msg01380.html>, 4 pages.
IP.com et al.; "Avoiding Unnecessary Wakeups When Waking Up CPUs At the Completion of a Grace Period", IPCOM000216206D, Mar. 25, 2012.
Hornbeck et al.; "Power Management in the Linux Kernel", Apr. 7, 2011, pp. 1-31.
McKenney, "Getting RCU Further Out of the Way", 2012 Linux Plumbers Conference, Real Time Microconference, Aug. 31, 2012, 31 pages.
A.T. Clements et al., "Scalable Address Spaces Using RCU Balanced Trees", ASPLOS' 12, Mar. 3-7, 2012, pp. 1-12.

* cited by examiner

```
1  struct srcu_struct_array {
2      int c[2];
3  };
4  struct srcu_struct {
5      int completed;
6      struct srcu_struct_array *per_cpu_ref;
7      struct mutex mutex;
8  };
```

```
1   int srcu_read_lock(struct srcu_struct *sp)
2   {
3       int idx;
4
5       preempt_disable();
6          idx = sp->completed & 0x1;
7          barrier();
8          per_cpu_ptr(sp->per_cpu_ref,
9             smp_processor_id())->c[idx]++;
10         srcu_barrier();
11      preempt_enable();
12      return idx;
13  }
```

FIG. 7 (PRIOR ART)

```
1   void srcu_read_unlock(struct srcu_struct *sp, int idx)
2   {
3       preempt_disable();
4          srcu_barrier();
5          per_cpu_ptr(sp->per_cpu_ref,
6                   smp_processor_id())->c[idx]--;
7       preempt_enable();
8   }
```

FIG. 8 (PRIOR ART)

```
1 void synchronize_srcu(struct srcu_struct *sp)
2 {
3     __synchronize_srcu(sp, synchronize_sched);
4 }
```

FIG. 9 (PRIOR ART)

```
1 void synchronize_srcu_expedited(struct srcu_struct *sp)
2 {
3     __synchronize_srcu(sp, synchronize_sched_expedited);
4 }
```

FIG. 10 (PRIOR ART)

```
1   void __synchronize_srcu(struct srcu_struct *sp, void
    (*sync_func)(void))
2   {
3     int idx;
4
5     idx = sp->completed;
6       mutex_lock(&sp->mutex);
7       if ((sp->completed - idx) >= 2) {
8          mutex_unlock(&sp->mutex);
9             return;
10      }
11    sync_func();
12       idx = sp->completed & 0x1;
13       sp->completed++;
14       sync_func();
15       while (srcu_readers_active_idx(sp, idx))
16          schedule_timeout_interruptible(1);
17    sync_func();
18       mutex_unlock(&sp->mutex);
19  }
```

FIG. 11 (PRIOR ART)

```
1   int srcu_readers_active_idx(struct srcu_struct *sp,
2          int idx)
3   {
4     int cpu;
5       int sum;
6
7     sum = 0;
8       for_each_possible_cpu(cpu)
9            sum += per_cpu_ptr(sp->per_cpu_ref, cpu)->c[idx];
10    return sum;
11  }
```

FIG. 12 (PRIOR ART)

```
1   struct srcu_struct_new_array {
2     unsigned long c[2];
3   };
4
5   #define SRCU_USAGE_BITS 2
6   #define SRCU_REF_MASK (ULONG_MAX >> SRCU_USAGE_BITS)
7   #define SRCU_USAGE_COUNT (SRCU_REF_MASK + 1)
8
9   struct srcu_struct_new {
10    unsigned completed;
11    struct srcu_struct_new_array __percpu *per_cpu_ref;
12    struct mutex mutex;
13    unsigned long snap[NR_CPUS];
14  };
```

```
1  int __srcu_read_lock_new(struct srcu_struct *sp)
2  {
3  int idx;
4
5  preempt_disable();
6  idx = rcu_dereference_index_check(sp->completed,
7  rcu_read_lock_sched_held()) & 0x1;
8  ACCESS_ONCE(per_cpu_ptr(sp->per_cpu_ref,
9   smp_processor_id())->c[idx]) += SRCU_USAGE_COUNT + 1;
10 smp_mb(); /* B */
11 preempt_enable();
12 return idx;
13 }
```

FIG. 16

```
1  void __srcu_read_unlock_new(struct srcu_struct *sp, int idx)
2  {
3    preempt_disable();
4    smp_mb(); /* C */
5    ACCESS_ONCE(per_cpu_ptr(sp->per_cpu_ref,
6    smp_processor_id())->c[idx]) += SRCU_USAGE_COUNT - 1;
7    preempt_enable();
8  }
```

FIG. 17

```
1 #define NO_EXPEDITE 0
2 void synchronize_srcu_new(struct srcu_struct *sp)
3 {
4     __synchronize_srcu(sp, NO_EXPEDITE);
5 }
```

FIG. 18

```
1 #define EXPEDITE 1
2 void synchronize_srcu_expedited(struct srcu_struct *sp)
3 {
4     __synchronize_srcu(sp, EXPEDITE);
5 }
```

FIG. 19

```
static void
1  __synchronize_srcu_new(struct srcu_struct *sp, bool expedited)
2  {
3    int idx;
4
5    idx = ACCESS_ONCE(sp->completed);
6    mutex_lock(&sp->mutex);
7    if (sp->completed == idx + 2)
8      idx = 1;
9    else if (sp->completed == idx + 3) {
10     mutex_unlock(&sp->mutex);
11     return;
12   } else
13     idx = 0;
14   for (; idx < 2; idx++)
15     flip_idx_and_wait(sp, expedited);
16   mutex_unlock(&sp->mutex);
17 }
```

FIG. 20

```
1  #define SYNCHRONIZE_SRCU_READER_DELAY 5
2
3  static void
4  flip_idx_and_wait(struct srcu_struct *sp, bool expedited)
5  {
6    int idx;
7    int trycount = 0;
8
9    idx = sp->completed++ & 0x1;
10   smp_mb(); /* D */
11   if (!srcu_readers_active_idx_check(sp, idx)) {
12     udelay(SYNCHRONIZE_SRCU_READER_DELAY);
13     while (!srcu_readers_active_idx_check(sp, idx)) {
14       if (expedited && ++ trycount < 10)
15         udelay(SYNCHRONIZE_SRCU_READER_DELAY);
16       else
17         schedule_timeout_interruptible(1);
18     }
19   }
20   smp_mb(); /* E */
21 }
```

FIG. 21

```
1  static bool
2  srcu_readers_active_idx_check(struct srcu_struct *sp, int idx)
3  {
4    int cpu;
5
6    if (srcu_readers_active_idx_new(sp, idx) != 0)
7      return false;
8    smp_mb(); /* A */
9    for_each_possible_cpu(cpu)
10     if (sp->snap[cpu] !=
11   ACCESS_ONCE(per_cpu_ptr(sp->per_cpu_ref, cpu)->c[idx]))
12     return false; /* False zero reading! */
13   return true;
14 }
```

FIG. 22

```
1   static unsigned long
2  srcu_readers_active_idx_new(struct srcu_struct *sp, int idx)
3  {
4    int cpu;
5    unsigned long sum = 0;
6    unsigned long t;
7
8    for_each_possible_cpu(cpu) {
9      t = ACCESS_ONCE(per_cpu_ptr(sp->per_cpu_ref, cpu)->c[idx]);
10     sum += t;
11     sp->snap[cpu] = t;
12   }
13    return sum & SRCU_REF_MASK;
14 }
```

FIG. 23

IN-KERNEL SRCU IMPLEMENTATION WITH REDUCED OS JITTER

BACKGROUND

1. Field

The present invention relates to computer systems and methods in which data resources are shared among concurrent data consumers while preserving data integrity and consistency relative to each consumer. More particularly, the invention concerns improvements to a "read-copy update" (RCU) variant known as sleepable RCU or SRCU.

2. Description of the Prior Art

By way of background, read-copy update is a mutual exclusion technique that permits shared data to be accessed for reading without the use of locks, writes to shared memory, memory barriers, atomic instructions, or other computationally expensive synchronization mechanisms, while still permitting the data to be updated (modify, delete, insert, etc.) concurrently. The technique is well suited to multiprocessor computing environments in which the number of read operations (readers) accessing a shared data set is large in comparison to the number of update operations (updaters), and wherein the overhead cost of employing other mutual exclusion techniques (such as locks) for each read operation would be high. For example, a network routing table that is updated at most once every few minutes but searched many thousands of times per second is a case where read-side lock acquisition would be quite burdensome.

The read-copy update technique implements data updates in two phases. In the first (initial update) phase, the actual data update is carried out in a manner that temporarily preserves two views of the data being updated. One view is the old (pre-update) data state that is maintained for the benefit of read operations that may have been referencing the data concurrently with the update. The other view is the new (post-update) data state that is available for the benefit of other read operations that access the data following the update. These other read operations will never see the stale data and so the updater does not need to be concerned with them. However, the updater does need to avoid prematurely removing the stale data being referenced by the first group of read operations. Thus, in the second (deferred update) phase, the old data state is only removed following a "grace period" that is long enough to ensure that the first group of read operations will no longer maintain references to the pre-update data.

FIGS. 1A-1D illustrate the use of read-copy update to modify a data element B in a group of data elements A, B and C. The data elements A, B, and C are arranged in a singly-linked list that is traversed in acyclic fashion, with each element containing a pointer to a next element in the list (or a NULL pointer for the last element) in addition to storing some item of data. A global pointer (not shown) is assumed to point to data element A, the first member of the list. Persons skilled in the art will appreciate that the data elements A, B and C can be implemented using any of a variety of conventional programming constructs, including but not limited to, data structures defined by C-language "struct" variables.

It is assumed that the data element list of FIGS. 1A-1D is traversed (without locking) by multiple concurrent readers and occasionally updated by updaters that delete, insert or modify data elements in the list. In FIG. 1A, the data element B is being referenced by a reader r1, as shown by the vertical arrow below the data element. In FIG. 1B, an updater u1 wishes to update the linked list by modifying data element B. Instead of simply updating this data element without regard to the fact that r1 is referencing it (which might crash r1), u1 preserves B while generating an updated version thereof (shown in FIG. 1C as data element B') and inserting it into the linked list. This may be done by u1 acquiring an appropriate lock, allocating new memory for B', copying the contents of B to B', modifying B' as needed, updating the pointer from A to B so that it points to B', and releasing the lock. As an alternative to locking, other techniques such as non-blocking synchronization (NBS) or a designated update thread could be used to serialize data updates. Data element B is partially maintained in the linked list by preserving its pointer to element C. All subsequent (post update) readers that traverse the linked list, such as the reader r2, will see the effect of the update operation by encountering B'. On the other hand, the old reader r1 will be unaffected because the original version of B and its pointer to C are retained. Although r1 will now be reading stale data, there are many cases where this can be tolerated, such as when data elements track the state of components external to the computer system (e.g., network connectivity) and must tolerate old data because of communication delays.

At some subsequent time following the update, r1 will have continued its traversal of the linked list and moved its reference off of B. In addition, there will be a time at which no other reader process is entitled to access B. It is at this point, representing expiration of the grace period referred to above, that u1 can free B, as shown in FIG. 1D.

FIGS. 2A-2C illustrate the use of read-copy update to delete a data element B in a singly-linked list of data elements A, B and C. As shown in FIG. 2A, a reader r1 is assumed be currently referencing B and an updater u1 wishes to delete B. As shown in FIG. 2B, the updater u1 updates the pointer from A to B so that A now points to C. The pointer from B to C is retained. In this way, r1 is not disturbed but a subsequent reader r2 sees the effect of the deletion. As shown in FIG. 2C, r1 will subsequently move its reference off of B, allowing B to be freed following expiration of the grace period.

In the context of the read-copy update mechanism, a grace period represents the point at which all running processes (or threads within a process) having access to a data element guarded by read-copy update have passed through a "quiescent state" in which they can no longer maintain references to the data element, assert locks thereon, or make any assumptions about data element state. By convention, for operating system kernel code paths, a context (process) switch, an idle loop, and user mode execution all represent quiescent states for any given CPU running non-preemptible code (as can other operations that will not be listed here). In some read-copy update implementations adapted for preemptible readers, all read operations that are outside of an RCU read-side critical section are quiescent states.

In FIG. 3, four processes 0, 1, 2, and 3 running on four separate CPUs are shown to pass periodically through quiescent states (represented by the double vertical bars). The grace period (shown by the dotted vertical lines) encompasses the time frame in which all four processes have passed through one quiescent state. If the four processes 0, 1, 2, and 3 were reader processes traversing the linked lists of FIGS. 1A-1D or FIGS. 2A-2C, none of these processes having reference to the old data element B prior to the grace period could maintain a reference thereto following the grace period. All post grace period searches conducted by these processes would bypass B by following the links inserted by the updater.

Grace periods may asynchronous or synchronous. According to the asynchronous technique, an updater performs the first phase update operation, specifies the second phase update operation as a callback, then resumes other processing with the knowledge that the callback will eventually be processed at the end of a grace period. The call_rcu( ) primitive represents one interface that RCU provides for use with asynchronous grace period detection. According to the synchronous technique, an updater performs the first phase update operation, blocks (waits) until a grace period has completed, and then implements the second phase update operation, such as by removing stale data. A primitive known as "synchronize_rcu( )" represents one interface that RCU provides for use with synchronous grace period detection. A related primitive known as "synchronize_rcu_expedited( )" speeds up grace period detection by approximately an order of magnitude, but at the expense of significant CPU overhead.

One variant of read-copy update known as sleepable read-copy update (SRCU) allows RCU readers to momentarily sleep while executing within their RCU read-side critical sections. This is accomplished by refusing to provide asynchronous grace-period interfaces, relying instead on synchronous grace period detection via calls to a pair of primitives known as "synchronize_srcu( )" and "synchronize_srcu_expedited( )" These primitives are the SRCU counterparts to the synchronize_rcu( ) and synchronize_rcu_expedited( ) primitives mentioned above. Unfortunately, these primitives (and especially the latter) can result in significant OS jitter due to the need to coordinate synchronous grace detection with the operations of readers as they enter and leave their SRCU read-side critical sections.

OS jitter represents undesirable variation in the latency of operating system kernel operations that should otherwise be determinative and predictable, particularly where real-time response is desired. A solution that improves SRCU's grace period detection operations would therefore be advantageous. What is needed in particular is an SRCU grace period detection solution that reduces OS jitter without significantly increasing read-side overhead and without significantly limiting scalability.

SUMMARY

A method, system and computer program product are disclosed for implementing SRCU with reduced OS jitter in a system having plural CPUs capable of executing concurrent readers and updaters of shared data. Example operations may include:

(1) providing a pair of critical section counters for each CPU, one critical section counter of each critical section counter pair being associated with a first grace period and the other critical section counter of each critical section counter pair being associated with a second grace period;

(2) when entering an SRCU read-side critical section involving reading the shared data, incrementing one of the critical section counters associated with the first grace period;

(3) when exiting an SRCU read-side critical section involving reading the shared data, decrementing one of the critical section counters associated with the first grace period;

(4) when updating the shared data, initiating the second grace period and performing a counter summation operation that sums the critical section counters associated with the first grace period to generate a critical section counter sum;

(5) storing a snapshot value for each of the critical section counters during the summing; and (6) if the critical section counter sum reaches a value indicating there are no SRCU read-side critical sections in progress for the first grace period, performing a recheck operation that compares the snapshot values to current values of the critical section counters associated with the first grace period to verify that the critical section counter sum is correct.

According to an illustrated embodiment, the example operations may further include (1) implementing a first memory barrier instruction following incrementing one of the critical section counters when entering an SRCU read-side critical section, (2) implementing a second memory barrier instruction preceding decrementing one of the critical section counters when exiting an SRCU read-side critical section, and (3) implementing a third memory barrier instruction following the counter summation operation and prior to the recheck operation when updating the shared data.

According to an illustrated embodiment, the example operations may further include (1) providing a pair of operations counters for each CPU, one operations counter of each operations counter pair being associated with a first grace period and the other operations counter of each operations counter pair being associated with a second grace period. (2) when entering or exiting an SRCU read-side critical section involving reading the shared data, incrementing one of the operations counters associated with the first grace period (3) the storing a snapshot value for each of the critical section counters during the summing including storing a snapshot of the operations counters, and (4) the recheck operation compares the snapshot values to current values of the critical section counters and the operations counters associated with the first grace period.

According to an illustrated embodiment, the critical section counters and the operations counters may be provided by counters that each include a critical section portion and an operations counter portion. The critical section portion may comprise lower bits of the counters and the operations counter portion comprises upper bits of the counters.

According to an illustrated embodiment, the example operations may further include (1) implementing a fourth memory barrier instruction following initiating the second grace period, and (2) implementing a fifth memory barrier instruction following the recheck operation verifying that the critical section counter sum is correct.

BRIEF DESCRIPTION OF THE DRAWINGS

The foregoing and other features and advantages of the invention will be apparent from the following more particular description of example embodiments of the invention, as illustrated in the accompanying Drawings, in which:

FIG. 7 shows C-language source code used to implement a prior art srcu_read_lock( ) primitive;

FIG. 8 shows C-language source code used to implement a prior art srcu_read_unlock( ) primitive;

FIG. 9 shows C-language source code used to implement a prior art synchronize_srcu( ) primitive;

FIG. 10 shows C-language source code used to implement a prior art synchronize_srcu_expedited() primitive;

FIG. 11 shows C-language source code used to implement a prior art synchronize_srcu() primitive;

FIG. 12 shows C-language source code used to implement a prior art srcu_readers_active_idx( ) primitive;

FIG. 16 shows example C-language source code that may be used to implement an _srcu_read_lock_new( ) primitive;

FIG. 17 shows example C-language source code that may be used to implement an _srcu_read_unlock_new( ) primitive;

FIG. 18 shows example C-language source code that may be used to implement a synchronize_srcu_new( ) primitive;

FIG. 19 shows example C-language source code that may be used to implement a synchronize_srcu_expedited_new( ) primitive;

FIG. 20 shows example C-language source code that may be used to implement a synchronize_srcu_new( ) primitive;

FIG. 21 shows example C-language source code that may be used to implement a flip_idx_and_wait( ) primitive;

FIG. 22 shows example C-language source code that may be used to implement an srcu_readers_active_idx_check( ) primitive;

FIG. 23 shows example C-language source code that may be used to implement an srcu_readers_active_idx_new( ) primitive;

DETAILED DESCRIPTION OF EXAMPLE EMBODIMENTS

Figure 1A:
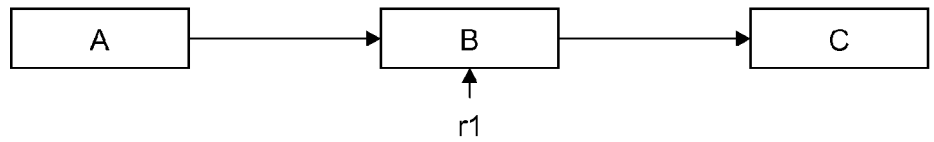
FIGS. 1A-1D are diagrammatic representations of a linked list of data elements undergoing a data element replacement according to a conventional read-copy update mechanism.
Figure 1B:
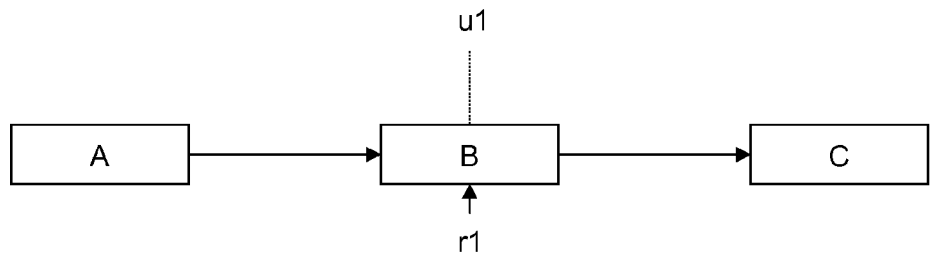
Figure 1C:
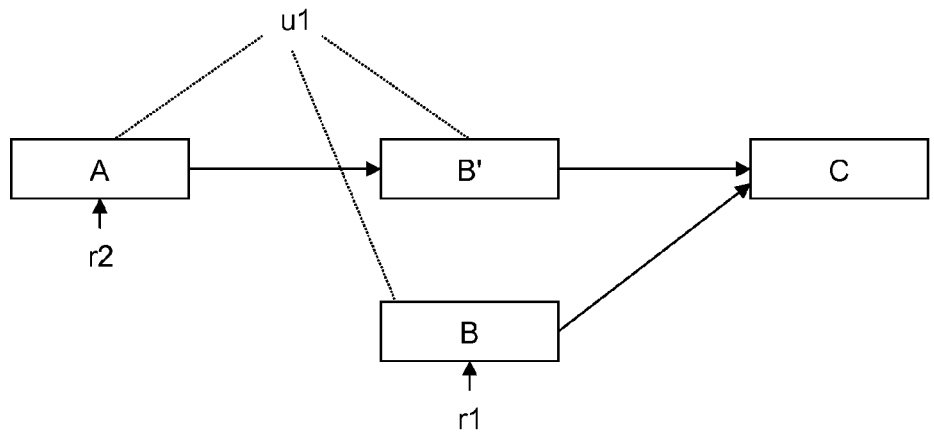
Figure 1D:
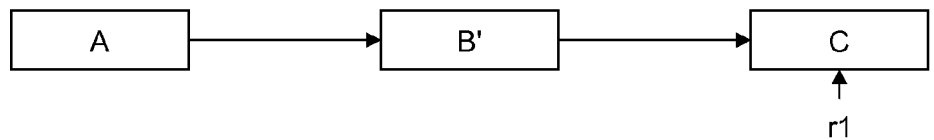
Figure 2A:
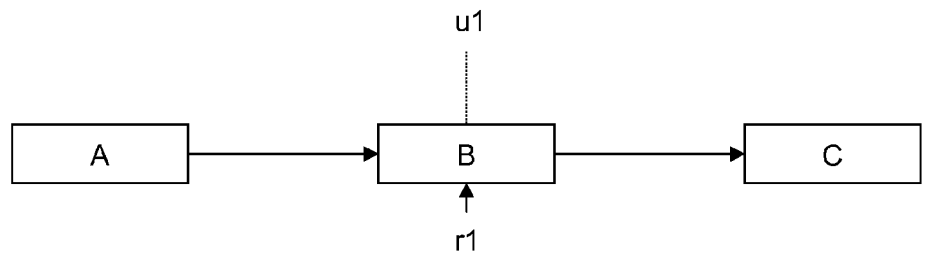
FIGS. 2A-2C are diagrammatic representations of a linked list of data elements undergoing a data element deletion according to a conventional read-copy update mechanism.
Figure 2B:
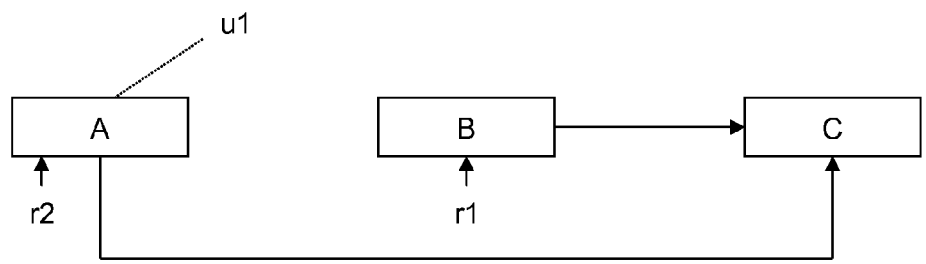
Figure 2C:
Figure 3:
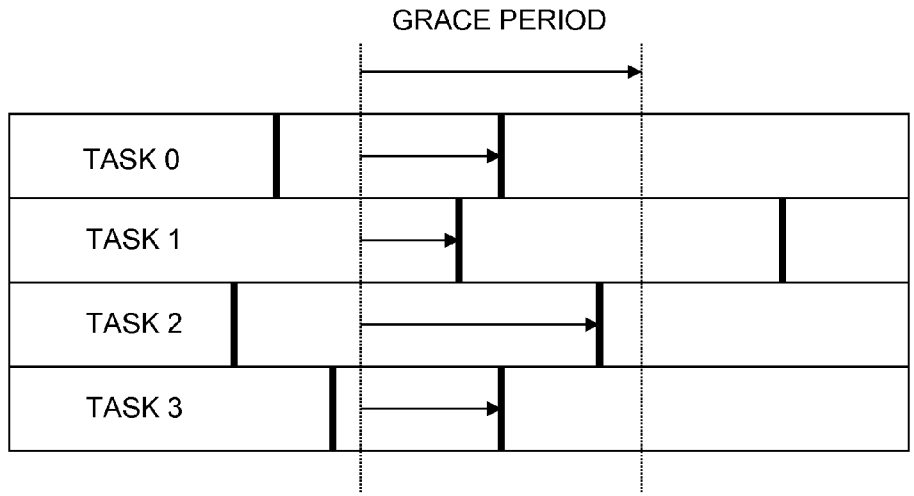
FIG. 3 is a flow diagram illustrating a grace period in which four processes pass through a quiescent state.
Figure 4:
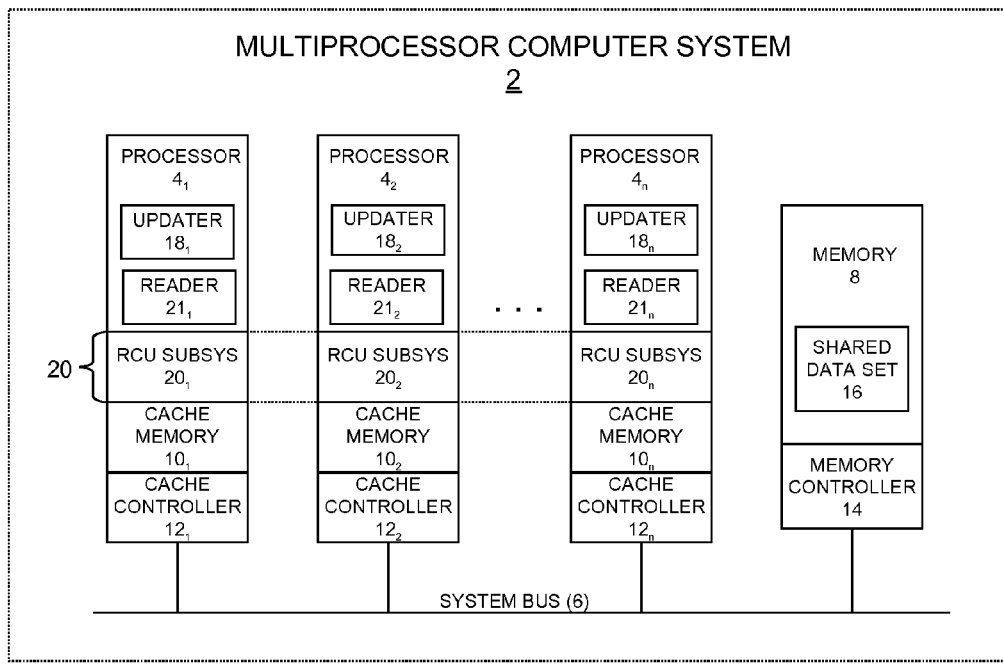
FIG. 4 is a functional block diagram showing an example multiprocessor computer system.

Turning now to the figures, wherein like reference numerals represent like elements in all of the several views, FIG. 4 illustrates an example multiprocessor computer system in which the grace period processing technique described herein may be implemented. In FIG. 4, a computer system 2 includes multiple processors $4_1, 4_2 \ldots 4_n$, a system bus 6, and a program memory 8. There are also cache memories $10_1, 10_2 \ldots 10_n$ and cache controllers $12_1, 12_2 \ldots 12_n$ respectively associated with the processors $4_1, 4_2 \ldots 4_n$. A conventional memory controller 14 is again associated with the memory 8. As shown, the memory controller 14 may reside separately from processors $4_2 \ldots 4_n$ (e.g., as part of a chipset). Alternatively, the memory controller 14 could be provided by plural memory controller instances respectively integrated with the processors $4_2 \ldots 4_n$ (as is known in the art).

The computer system 2 may represent any of several different types of computing apparatus. Such computing apparatus may include, but are not limited to, general purpose computers, special purpose computers, portable computing devices, communication and/or media player devices, set-top devices, embedded systems, and other types of information handling machines. The term "processor" as used with reference to the processors $4_1, 4_2 \ldots 4_n$ encompasses any program execution unit capable of executing program instructions, including but not limited to a packaged integrated circuit device (such as a microprocessor), a processing core within a packaged integrated circuit device (such as a microprocessor core), or a hardware thread comprising one or more functional units within a processing core (such as an SMT thread). Each such execution unit may be referred to as a CPU (central processing unit). The processors $4_1, 4_2 \ldots 4_n$ may be situated within a single computing device or node (e.g., as part of a single-node SMP system) or they may be distributed over plural nodes (e.g., as part of a NUMA system, a cluster, or a cloud). The memory 8 may comprise any type of tangible storage medium capable of storing data in computer readable form for use in program execution, including but not limited to, any of various types of random access memory (RAM), various flavors of programmable read-only memory (PROM) (such as flash memory), and other types of primary storage (i.e., program memory). The cache memories $10_1, 10_2 \ldots 10_n$ may be implemented in several levels (e.g., as level 1, level 2 and level 3 caches) and the cache controllers $12_1, 12_2 \ldots 12_n$ may collectively represent the cache controller logic that supports each cache level. As illustrated, the memory controller 14 may reside separately from processors $4_1, 4_2 \ldots 4_n$, for example, as part of a discrete chipset. Alternatively, the memory controller 114 could be provided by plural memory controller instances that are respectively integrated with the processors $4_1, 4_2 \ldots 4_n$.

Each CPU embodied by a given processor 4 is operable to execute program instruction logic under the control of a software program stored in the memory 8 (or elsewhere). As part of this program execution logic, update operations (updaters) 18 may execute within a process, thread, or other execution context (hereinafter "task") on any of the processors 4. Each updater 18 runs periodically to perform updates on a set of shared data 16 that may be stored in the shared memory 8 (or elsewhere). In FIG. 4, reference numerals $18_1, 18_2 \ldots 18_n$ illustrate individual data updaters that respectively execute on the several processors $4_1, 4_2 \ldots 4_n$. As described in the "Background" section above, the updates performed by an RCU updater can include modifying elements of a linked list, inserting new elements into the list, deleting elements from the list, and other types of operations. To facilitate such updates, the processors 4 are programmed from instructions stored in the memory 8 (or elsewhere) to implement a read-copy update (RCU) subsystem 20 as part of their processor functions. In FIG. 4, reference numbers $20_1, 20_2 \ldots 20_n$ represent individual RCU instances that may periodically execute on the several processors $4_1, 4_2 \ldots 4_n$. Any given processor 4 may also execute a read operation (reader) 21. Each reader 21 runs from program instructions stored in the memory 8 (or elsewhere) in order to periodically perform read operations on the set of shared data 16 stored in the shared memory 8 (or elsewhere). In FIG. 4, reference numerals $21_1, 21_2 \ldots 21_n$ illustrate individual reader instances that may respectively execute on the several processors $4_1, 4_2 \ldots 4_n$. Such read operations will typically be performed far more often than updates, this being one of the premises underlying the use of read-copy update. Moreover, it is possible for several of the readers 21 to maintain simultaneous references to one of the shared data elements 16 while an updater 18 updates the same data element.

During operation of the computer system 2, an updater 18 will occasionally perform an update to one of the shared data elements 16. In accordance the philosophy of RCU, a first-phase update is performed in a manner that temporarily preserves a pre-update view of the shared data element for the benefit of readers 21 that may be concurrently referencing the shared data element during the update operation. Following the first-phase update, the updater 18 may request a synchronous grace period or a synchronous expedited grace period.

As briefly discussed in the background section above, one variant of read-copy update known as sleepable read-copy update (SRCU) allows RCU readers to momentarily sleep while executing within their RCU read-side critical sections. This is accomplished by refusing to provide asynchronous grace-period interfaces, relying instead on synchronous grace period detection via calls to a pair of primitives known as "synchronize_srcu( )" and "synchronize_srcu_expedited( )" Grace period detection is also isolated within each subsystem that uses SRCU by a data structure known as "srcu_struct" for each distinct SRCU usage. This approach prevents SRCU read-side critical sections from blocking unrelated synchronize_srcu( ) and synchronize_rcu_expedited( ) invocations.

Figures 5, 6:
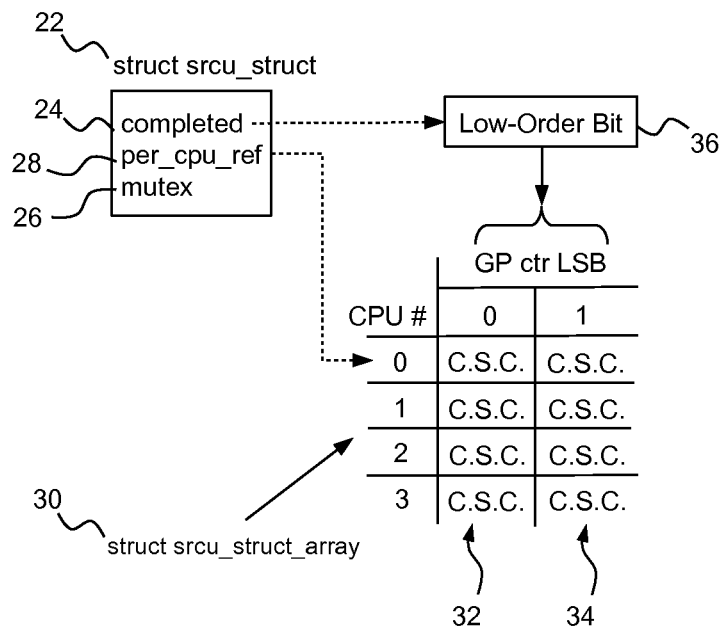
FIG. 5 is a diagrammatic representation of an prior art scru_struct data structure used in conventional SRCU implementations.
FIG. 6 shows C-language source code used to implement the prior art srcu_struct data structure of FIG. 5.

An example prior art srcu_struct data structure 22 is shown graphically in FIG. 5 and in C-language source code format in FIG. 6. Each srcu_struct data structure 22 (lines 4-8 of FIG. 6) maintains its own grace period counter 24 (line 5 of FIG. 6), a mutex lock 26 (line 7 of FIG. 6), and a pointer 28 (line 6 of FIG. 6) to a set of two-element counter arrays 30, called "srcu_struct_array" (lines 1-3 of FIG. 6), representing per-CPU counter pairs that track SRCU read-side critical sections. Each critical section counter pair for a given CPU has a one critical section counter (C.S.C.) 32 for a current grace period and another critical section counter (C.S.C.) 34 for the next grace period. As explained in the paragraph below, the critical section counters 32 and 34 are used by SRCU readers as they enter and leave SRCU read-side critical sections. An index 36 representing the least significant bit the grace period counter 24 determines which counter of each counter pair 32/34 is to be used.

SRCU readers invoke the primitives "srcu_read_lock( )" and "srcu_read_unlock( )" to demarcate the beginning and end of their SRCU read-side critical sections. These primitives each respectively increment and decrement one of the per-CPU critical section counters 32/34 in the srcu_struct data structure 22, namely, the counter associated with the reader's current CPU and with the index 36 determined from the grace period counter 24. FIGS. 7 and 8 respectively illustrate prior art C-language source code that is conventionally used to implement the srcu_read_lock( ) and srcu_read_unlock( ) primitives.

As shown in FIG. 7, the conventional srcu_read_lock( ) primitive takes a pointer to the srcu_struct data structure 22. Lines 5 and 11 disable and re-enable preemption in order to force the intervening sequence of code to execute unpreempted on a single CPU. Line 6 picks up the bottom bit of the grace-period counter 24 in the srcu_struct data structure 22, which is used as the index 36 to select which rank of critical section counters 32/34 is to be used for the reader's SRCU read-side critical section. The barrier( ) call on line 7 is a directive to the compiler that ensures that the index is fetched but once, so that the index used on line 9 is the same one returned on line 12. Lines 8-9 increment the selected counter for the current CPU. Line 10 forces subsequent execution to occur after lines 8-9, in order to prevent to misordering of any code in an non-preemptible operating system kernel, but only from the perspective of an intervening interrupt handler. However, in a preemptible kernel, the required barrier( ) call is embedded in the preempt enable( ) on line 11, so the srcu_barrier( ) is a no-op in that case. Finally, line 12 returns the index 36 so that it may be passed in to the corresponding invocation of srcu_read_unlock( )

As shown in FIG. 8, the conventional srcu_read_unlock( ) primitive takes a pointer to the srcu_struct data structure 22 and the index returned by srcu_read_lock( ) Lines 3 and 7 disable and re-enable preemption so that the intervening code sequence executes unpreempted on a single CPU. In preemptible operating system kernels, the preempt_disable( ) on line 3 contains a barrier( ) primitive, otherwise, the barrierOis supplied by line 4. Again, this directive forces the subsequent code to execute after the srcu read-side critical section from the perspective of intervening interrupt handlers. Lines 5 and 6 decrement the critical section counter 32/34 for the current CPU using the same value for the index 36 that was used by the corresponding invocation of srcu_read_lock( )

FIGS. 9 and 10 illustrate example C-language source code used in conventional implementations of the synchronize_srcu( ) and synchronize_srcu_expedited grace period detection primitives. As previously mentioned, these primitives are called by updaters to force a synchronous grace period following a first-phase RCU data element update. Both primitives are wrapper functions that call a work function named _synchronize_srcu( ) which is shown in FIG. 11. As would be expected, the conventional _synchronize_srcu( ) work function takes a pointer to the srcu_struct data structure 22. It is also called with a pointer to a synchronization function "sync_func( )" As shown in line 3 of FIGS. 9 and 10, this synchronization function is "synchronize_sched( )" when _synchronize_srcu( ) is invoked by synchronize_srcu( ) and "synchronize_sched_expedited( )" when _synchronize_srcu( ) is invoked by synchronize_srcu_expedited( ).

Within the work function _synchronize_srcu( ) (FIG. 11), line 5 takes a snapshot of the grace-period counter 24. Line 6 acquires the mutex 26, and lines 7-10 check to see whether at least two grace periods have elapsed since the snapshot. If so, the mutex 26 is released and the function returns. This case represents a scenario where another updater has already done the required grace period advancement work. Otherwise, a call to either synchronize_sched( ) or synchronize_sched_expedited( ) is made on line 11. Both of these functions block until all currently-executing preempt-disabled regions of code complete. In srcu_read_lock( ) this is the preempt-disabled code between lines 5-11 that acquires the index 36 and increments one of the counters 32 or 34. The call to synchronize_sched( ) or synchronize_sched_expedited( ) on line 11 thus guarantees that any other CPU that sees an incremented value of the critical section counter 32/34 produced by a call to srcu_read_lock( ) on that CPU also sees any changes made by the current CPU prior to entering _synchronize_srcu( ). This guarantee is required to make sure that any SRCU read-side critical sections not blocking the next grace period have seen any prior changes.

Line 12 fetches the bottom bit of the grace-period counter 24 for later use as the index 36 into the counter arrays 30, and then line 13 increments the grace-period counter. A second call to either synchronize_sched( ) or synchronize_sched_expedited( ) in line 14 waits for any currently-executing invocations of srcu_read_lock( ) to complete, so that by the time that line 15 is reached, all extant instances of srcu_read_lock( ) will be using the updated value of the grace period counter 24 that was incremented in line 13. Line 15 commences a while loop that invokes a function known as "srcu_readers_active_idx( )" to sum all of the critical section counters 32 or 34 associated with the index 36 until the sum equals zero. Before proceeding with further discussion of _synchronize_srcu( ) it will helpful to consider the operations performed by srcu_readers_active_idx( )

FIG. 12 illustrates example C-language source code used in conventional implementations of the srcu_readers_active_idx( ) primitive. As can be seen, this function is passed a pointer to the srcu_struct data structure 22, as well as the value of the index 36 from line 12 of _synchronize_srcu( ) Lines 8 and 9 then sum all the critical section counters 32 or 34 for that index value for each possible CPU. Due to the call to synchronize_sched( ) or synchronize_sched_expedited( ) in line 14 of synchronize_srcu( ) the counters 32 or 34 sampled by srcu_readers_active_idx( ) on line 15 of synchronize_srcu( ) are guaranteed to be monotonically decreasing, so that once their sum reaches zero, it is guaranteed to stay there. It will be observed that the critical section counters 32/34 for any given grace period are counted in modular-arithmetic fashion. This means that the sum of any proper subset of a particular CPU's counter array 30 is meaningless. The critical section counters 32 or 34 for all CPUs must be summed to determine the current number of SRCU read-side critical sections. The reasons for this is that a given critical section's srcu_read_lock( ) might execute on one CPU while its srcu_read_unlock( ) might execute on another. Any given critical section counter 32/34 therefore only reflects the net number of SRCU read-side critical sections entered on the associated CPU, and only the net number across the entire system (comprising all CPUs) has meaning Returning now to FIG. 11, line 17 of _synchronize_srcu( ) invokes synchronize_sched( ) or synchronize_sched_expedited( ) a third time. This ensures that if the loop on line 15 saw a CPU leave an SRCU read-side critical section, then any updates in the code following the call to synchronize_srcu( ) will happen after any code in the corresponding SRCU read-side critical section. Line 18 releases the mutex 26. The third call to synchronize_sched( ) or synchronize_sched_expedited( ) on line 17 pertains to srcu_read_unlock( ) which also has a preempt-disabled code section between lines 3-7, which decrements one of the critical section counters 32 or 34 using the index 36. It will be seen in FIG. 8 that there are no memory barrier instructions in the srcu_read_unlock( ) primitive. The CPU executing this primitive is thus within its rights to reorder the counter decrement up into the SRCU critical section, so that references to an SRCU-protected data structure could in effect "bleed out" of the SRCU critical section. This scenario is addressed by the call to either synchronize_sched( ) or synchronize_sched_expedited( ) on line 17, which as noted above, block until all other CPUs executing in preempt_disable( ) ode sequences (such as lines 3-7 of srcu_read_unlock( ))) complete those sequences. Because completion of a given preempt_disable( ) code sequence is observed from the CPU executing that sequence, completion of the sequence implies completion of any prior SRCU read-side critical section. Any required memory barriers are supplied by the code making the observation.

As indicated above, the synchronize_srcu_expedited( ) primitive ends a synchronous grace period about one order of magnitude faster than synchronize_srcu( ) but with significantly increased CPU overhead. This is due to invocation of synchronize_sched_expedited( ) which is analogous to synchronize_sched( ) but also invokes a function called "try_stop_cpus( )" that attempts to preempt the tasks running on all online CPUs.

Applicant has observed that SRCU's repeated use of synchronize_sched( ) and synchronize_sched_expedited( ) results in long latencies. This is particularly the case with synchronized sched_expedited( ) due to its use of try_stop_cpus( ) which uses inter-processor interrupts to cause needed functions to execute on other CPUs. These latencies impose significant OS jitter on the system, which in turn can degrade real-time response as well as throughput for short-iteration HPC (High Performance Computing) applications. Moreover, for synchronize_sched_expedited( ), the stop-machine facility implemented by try_stop_cpus( ) serializes with other uses of the stop-machine facility. As such, a pair of concurrent calls to synchronize_sched_expedited( ) cannot actually run concurrently, even if they use different srcu_struct structures.

It will be appreciated from the foregoing discussion that the current mainline implementations of SRCU use synchronize_sched( ) and synchronize_sched_expedited( ) to wait for the completion of all tasks that previously started executing either srcu_read_lock( ) or srcu_read_unlock( ). It is this waiting operation that results in OS jitter. The reason that these wait-for-reader mechanisms are used is to ensure that by the time synchronize_sched( ) and synchronize_sched_expedited( ) start summing the critical section counters 32/34, these counters will only be decremented, never incremented. This means that if the sum ever reaches zero, it is guaranteed that all preexisting SRCU read-side critical sections have completed. Avoiding the wait-for-reader mechanisms means that synchronize_srcu( ) and synchronize_srcu_expedited( ) must deal with the possibility that the critical section counters 32/34 will be incremented as well as decremented during the summation operation. This can happen if a read operation is delayed after fetching the index 36 and does not resume execution to perform its counter increment until after an updater advances the grace period counter 24 and begins summing the counters associated with the old index.

If the reader operation's counter increment is implemented on a CPU that has already been scanned, the increment will go undetected. If the read operation later performs its counter decrement on a different CPU that has not yet been scanned, the updater will detect the decrement without any knowledge of the previous increment. In some cases, the effect of an undetected counter increment combined with a detected counter decrement may delay the counter summation from reaching zero, which will delay the end of the associated grace period. In other cases, it is possible for an undetected counter increment followed by a detected counter decrement to produce a false zero result. In this scenario, the read operation whose counter increment was undetected but whose counter decrement is detected runs in parallel with a second read operation whose counter increment was detected but whose counter decrement has not yet occurred. The first read operation's counter decrement may then be paired with the second read operation's counter increment, causing the associated grace period to end even though the second read operation is still in its SRCU read-side critical section.

To see why this scenario involving unaccounted critical section counter increments can be problematic, consider the following sequence of events (hereinafter referred to as the "Problem Example"):

1. Task A is in a long-running SRCU read-side critical section that started on CPU 1. Task A is the only SRCU reader in the system, such that CPU 1's critical section counter 32 or 34 for the index 36 determined when CPU 1 entered its critical section sum will have a value of +1.
2. Task B starts executing srcu_read_lock( ) on CPU 0, fetching the value of the grace period counter 24 in srcu_struct 22 and extracting the bottom bit to use as the index 36, but not yet incrementing the corresponding critical section counter 32 or 34.

3. Task C begins executing synchronize_srcu( ) or synchronize_srcu_expedited( ) and therefore increments the grace period counter 24 and starts summing the critical section counters 32 or 34 for the index 36 associated with the grace period counter's pre-incremented value. It is assumed that this is the same index value that was extracted by Tasks A and B during their srcu_read_lock( ) operations. After summing CPU 0's and CPU 1's critical section counters, Task C is delayed. Since Task B did not yet increment its critical section counter 32 or 34 on CPU 0 before Task C's summation operation, the counter sum will be +1 to reflect only Task A's increment on CPU 1.

4. Task B continues executing in srcu_read_lock( ) on CPU 0, using the now-obsolete index 36 to increment the associated critical section counter 32 or 34 for CPU 0 to a value of +1.

5. Task B is migrated to CPU 2, where it decrements the critical section counter 32 or 34 associated with the old index 36 to a value of −1.

6. Task C continues in synchronize_srcu( ) summing the remainder of the counters, including that of CPU 2. Task C will see Task B's decrement on CPU 2 but not its increment on CPU 0. Task C therefore arrives at a sum of zero (+1 on CPU 1 and −1 on CPU 2) instead of the correct sum of +1 (to account for CPU 0). This could cause Task C to conclude that the grace period has completed, despite the fact that Task A is still in its pre-existing SRCU read-side critical section.

Applicant's solution to the foregoing problem rests on a number of observations:

Observation 1: If during the summation operation, a snapshot of all the summed critical section counters 32 or 34 for a given index value is taken, then if the sum is zero, a recheck operation can be performed in which the current (possibly changed) values of the counters are compared to the snapshot to detect the above sequence of events. In the above-described Problem Example, the recheck operation would detect a problem on CPU 0 by picking up Task B's counter increment on that CPU.

Observation 2: Even if the above-mentioned recheck operation is performed, there are situations involving a counter increment on one CPU immediately followed by a counter decrement on another CPU in which the recheck operation of Observation 1 will not reveal a false zero summation. In this scenario, there is a third read operation that also increments and decrements the counters 32 or 34 associated with the old value of the counter index 36 during the summation operation. For example, consider a modification of the above-described Problem Example wherein an additional step 5.5 is performed between steps 5 and 6. In step 5.5, a fourth task D executing srcu_read_lock( ) on CPU 1 performs a counter increment during the counter summation operation after having previously acquired the same index value used by Tasks A and B. However, due to memory reordering, the counter increment by Task D is not seen by Task C. Task D then immediately ends its SRCU read-side critical section on CPU 0, decrementing that CPU's counter. During the recheck operation described in Observation 1, the counter decrement by Task D on CPU 0 in step 5.5 will pair with the counter increment by Task B on CPU 0 in step 2. The recheck operation will thus itself falsely conclude that the counter sum is zero. This situation can be avoided if the counters 32 and 34 are each split into two fields. The lower field acts to count the number of active SRCU read-side critical sections, as before, while the upper field is incremented by both srcu_read_lock( ) and srcu_read_unlock( ) to represent a count of such operations (i.e., an operations counter).

Observation 3: 32-bit systems have a very limited number of bits for implementing the counters 32/34. However, if a given CPU can be restricted to incrementing its old critical section counter 32 or 34 at most once, a pair of bits is sufficient for the upper field used as the operations counter, leaving 30 bits for the lower field used as the critical section counter. This allows the product of the number of tasks and the per-task nesting level for a given SRCU domain to range as high as one billion, which should suffice. Note that maintaining 4K kernel stacks for each task means that a 32-bit address space is exhausted by one million tasks, allowing nesting levels up to one thousand, which again should suffice. Given proper use of memory barriers, a given CPU can be restricted to incrementing the old critical section counter 32 or 34 at most once after an updater increments the grace period counter 24 to start a new grace period. On its next instance of srcu_read_lock( ) the CPU will refetch the grace period counter 24, obtaining a new value for the index 36.

Figure 13:
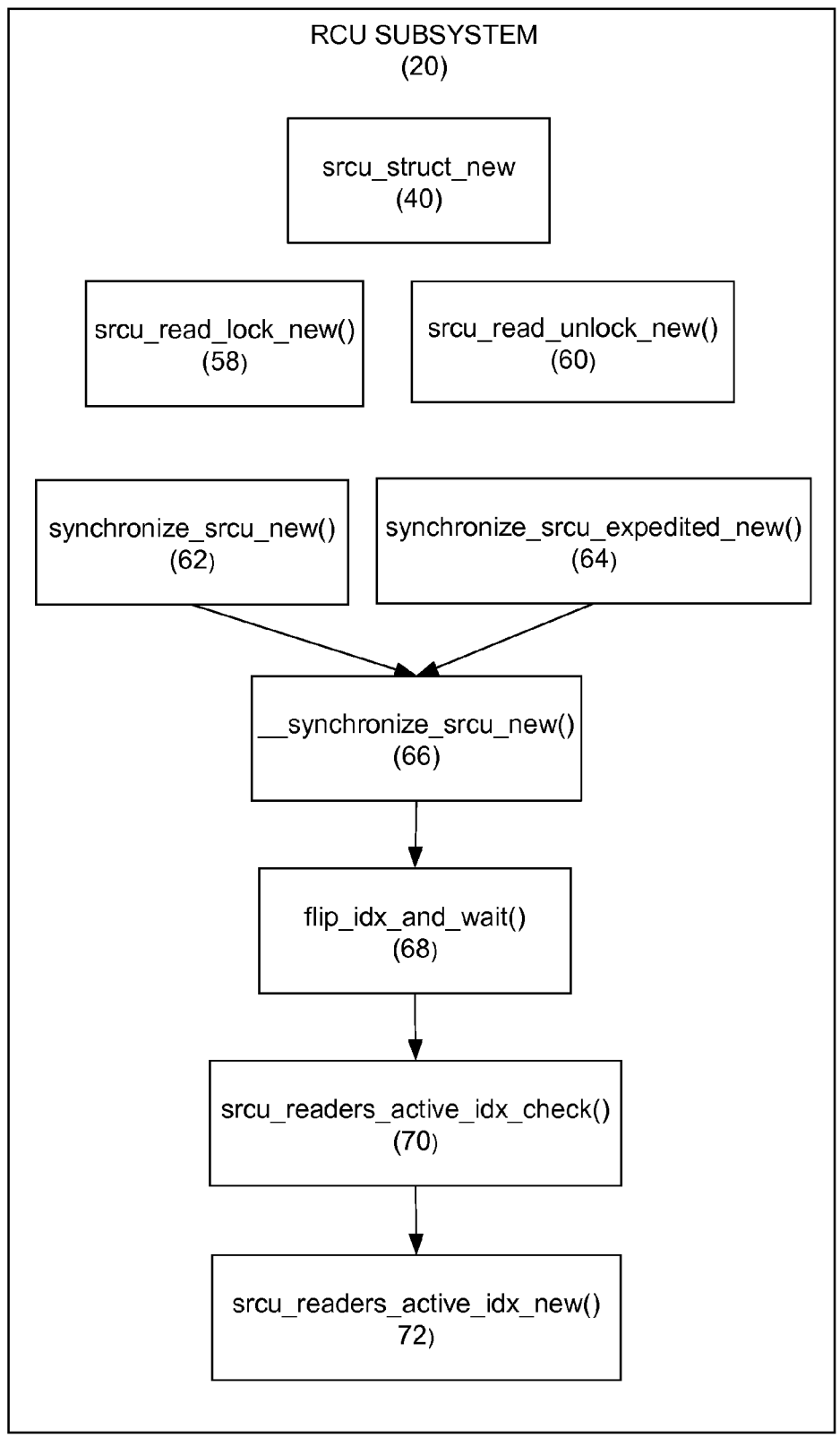
FIG. 13 is a functional block diagram showing example components of an RCU subsystem.
Figures 14, 15:
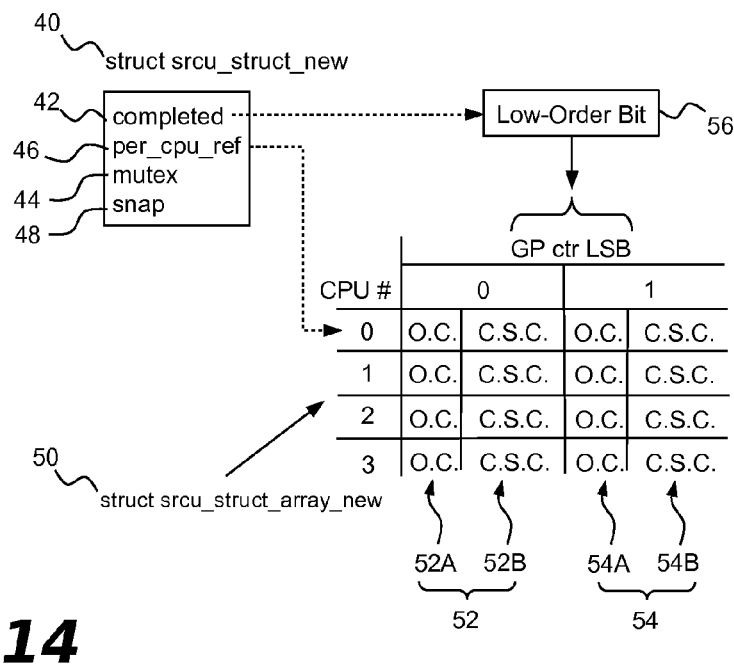
FIG. 14 is a diagrammatic representation of an scru_struct_new data structure.
FIG. 15 shows example C-language source code that may be used to implement the srcu_struct_new data structure of FIG. 14.

Turning now to FIG. 13, which shows relevant components of the RCU subsystem 20, the proposed solution may be conveniently implemented by using a modified version of the srcu_struct data structure 22 (shown in FIGS. 5 and 6). This modified version is shown in FIG. 13 as the "srcu_struct_new" data structure 40. The srcu_struct_new data structure 40 is shown graphically in FIG. 14, and example C-language source code that may be used to implement this data structure is shown in FIG. 15. Like the existing srcu_struct data structure 22, each srcu_struct_new data structure 40 (lines 9-14 of FIG. 15) maintains its own grace period counter 42 (line 10), a mutex lock 44 (line 12), and a pointer 46 (line 11) to a set of two-element counter arrays 50, called "srcu_struct_new array" (lines 1-3), representing per-CPU counter pairs 52/54.

The srcu_struct_new data structure 40 differs from the srcu_struct data structure 22 in that a new array variable "snap" 48 is added on line 13 of FIG. 15. Moreover, the data type of the two-element counter arrays 50 is changed from "int" to "unsigned long." In addition, the bits of the per-CPU counters 52/54 are divided to provide separate counters 52A/52B and 54A/54B within each main counter. The counters 52A and 54A are operations counters (O.C.) that track the number of srcu_read_lock( ) and srcu_read_unlock( ) operations on each CPU during a given grace period. The counters 52B and 54B are critical section counters (C.S.C.) that perform the same function as the critical section counters 32/34 of FIG. 5. An index 56 representing the least significant bit the grace period counter 24 determines which critical section counter 52B or 54B of each counter pair 52/54 is to be used.

The counters 52A/52B and 54A/54B are defined by the three preprocessor macros on lines 5-7 of FIG. 15. The SRCU_USAGE_BITS macro defined on line 5 determines how many upper bits of each counter 52 and 54 are to be used as the operations counters 52A and 54A to count srcu_read_lock( ) and srcu_read_unlock( ) operations. The SRCU_REF_MASK macro defined on line 6 is a mask that isolates the low-order bits of each counter 52 and 54 to serve as the critical section counters 52B and 54B that count the current number of SRCU read-side critical sections. The SRCU_USAGE_COUNT macro defined on line 7 is a number that may be added to a given counter 52 or 54 to increment its upper bits, which comprise one of the operation counters 52A or 54B. The snap field 48 of the srcu_struct_new data structure 40 is used to take a snapshot of the currently inactive rank of critical section counters 52B or 54B not associated with the current value of the index 56.

The key point of dividing the bits of each counter 52/54 bits into an operations counter 52A/54A and a critical-section counter 52B/54B is to be able to reliably detect counter changes cause by rapid entry and exit into and out of an SRCU read-side critical section. To see this, consider that in the conventional counter array 30 of FIG. 5, an srcu_read_lock( ) followed by an srcu_read_unlock( ) will return a counter to its original value, making it impossible to determine that a change has actually occurred. In contrast, as will be seen below in connection with the discussion of reader operations, if a new-style counter 52/54 starts with the value zero, an srcu_read_lock( ) will update the counter to 0x40000001 (assuming the counter is 32 bits), and a subsequent srcu_read_unlock( ) will update the counter to 0x80000000, which differs from zero. Use of this divided-counter scheme means that more than one billion operations are required to return the lower 30 bits of the counter 52/54 (representing the critical section counters 52B/54B) to their original value. Such an overflow is unlikely to happen during critical update-side operations.

Figure 24:
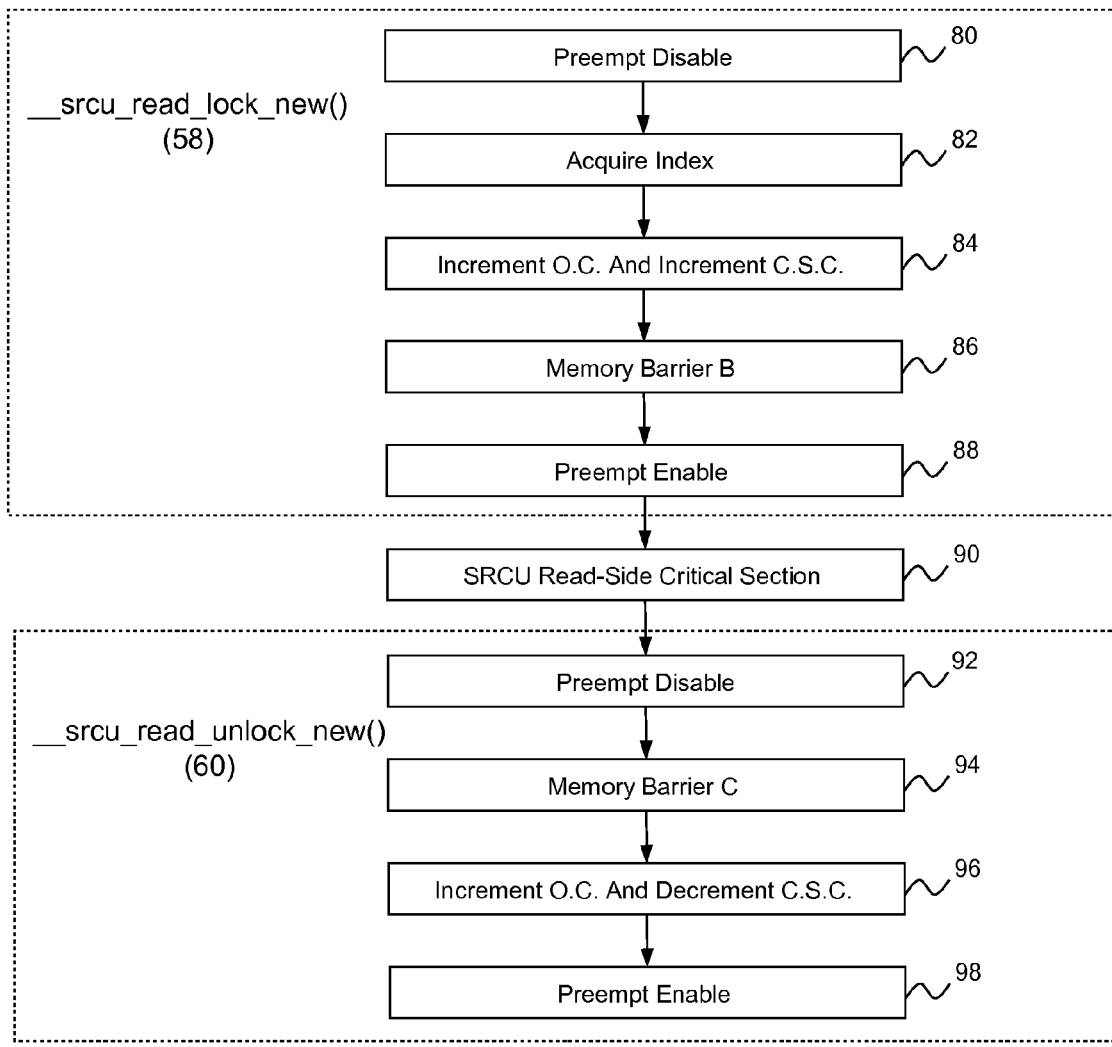
FIG. 24 is a flow diagram showing example reader operations using the _srcu_read_lock_new( ) and_srcu_read_unlock_new( ) primitives.

The proposed solution herein further contemplates modified versions of the existing srcu_read_lock( ) and srcu_read_unlock( ) primitives. These modified reader primitives are shown in FIG. 13 as "srcu_read_lock_new( )" 58 and "srcu_read_unlock_new( )" 60. FIGS. 16 and 17 respectively show example C-language source code that may be used to implemented the reader primitives. The new primitives respectively resemble the srcu_read_lock( ) and srcu_read_unlock( ) shown in FIGS. 7 and 8, but with modifications designed to eliminate the OS jitter problems of existing SRCU implementations. FIG. 24 is a flow diagram showing reader operations that include srcu_read_lock_new( ) 58 and srcu_read_unlock_new( ) 60.

In FIG. 16, srcu_read_lock_new( ) 58 disables preemption on line 5 (block 80 of FIG. 24) and reenables it on line 11 (block 88 of FIG. 24) in order to ensure that there are no conflicting accesses to the running CPU's instance of the counter array 50. Lines 6 and 7 (block 82 of FIG. 24) fetch the current value of the bottom bit of the grace period counter 42, with the rcu_dereference_index_check( ) instruction ensuring that dependency ordering holds to the counter manipulation of lines 8 and 9. In lines 8 and 9 (block 84 of FIG. 24), one of the counters 52 or 54 of this CPU's counter array 50 (per the index 56) is incremented. The incrementation results in both the operations counter 52A or 54A and the critical section counter 52B or 54B of the selected counter 52 or 54 being incremented. Line 10 (block 86 of FIG. 24) executes an smp_mb( ) memory barrier instruction that shall be referred to hereinafter as "memory barrier B." Memory barrier B ensures that the contents of the subsequent critical section do not "bleed out" past the counter increment, and will be explained in more detail below in the discussion of update-side operations. Finally, line 12 returns the index 56 so that the corresponding call to srcu_read_unlock_new( ) 60 will decrement the corresponding counter 52 or 54 of the counter array 50 on whichever CPU it happens to be running on. The main difference between srcu_read_lock_new( ) 58 of FIG. 16 and the conventional srcu_read_lock( ) primitive shown in FIG. 7 is the manipulation of both sides of the counters 52/54 by incrementing one operations counter 52A or 54A and one critical section counter 52B or 54B. Additional differences include the counter incrementation being performed using rcu_dereference_index_check( ) in line 6 instead of a compiler-only barrier( ) instruction, the use of ACCESS_ONCE( ) on line 8, and the promotion of a compiler-only srcu_barrier( ) instruction to smp_mb( ) on line 10.

Once a reader has successfully invoked srcu_read_lock_new( ) 58, the reader may enter its SRCU read-side critical section, as shown by block 90 in FIG. 24. The reader then invokes srcu_read_unlock_new( ) 60. In FIG. 17, srcu_read_unlock_new( ) 60 disables preemption on line 3 (block 92 of FIG. 24) and reenables it on line 7 (block 98 of FIG. 24), again to ensure that there are no conflicts between different tasks updating the current CPU's counter array 50. Line 4 (block 94 of FIG. 24) executes an smp_mb( ) memory barrier instruction that shall be referred to hereinafter a "memory barrier C." Memory barrier C prevents the prior read-side critical section from "bleeding out" past the counter manipulation of lines 5 and 6. In lines 5 and 6 (block 96 of FIG. 24), an operations counters 52A or 54A in the upper bits of one of the counters 52 or 54 is incremented while simultaneously a critical section counter 52B or 54B in the lower bits of the same counter is decremented. A more complete explanation of the function of Memory barrier C of line 4 will be undertaken below in the discussion of update-side operations. The main difference between srcu_read_unlock_new( ) 60 of FIG. 17 and the conventional srcu_read_unlock( ) primitive shown in FIG. 8 is the manipulation of both sides of the counters 52/54 by incrementing one operations counter 52A or 54A and decrementing one critical section counter 52B or 54B. Additional differences include the use of ACCESS_ONCE( ) on line 5, and the promotion of a compiler-only barrier( ) instruction to the smp_mb( ) instruction that implements memory barrier C on line 4.

Referring back to FIG. 13, the proposed solution disclosed herein further contemplates several update-side primitives. In particular, there are modified versions of the synchronize_srcu( ) and synchronize_srcu_expedited( ) primitives (shown in FIGS. 9 and 10). These modified primitives are respectively shown in FIG. 13 as "synchronize_srcu_new( )" 62 and "synchronize_srcu_expedited( )" 64. There is also a modified version of the synchronize_srcu( ) work function (shown in FIG. 11). This modified primitive is shown in FIG. 13 as "_synchronize_srcu_new( )" 66. Two new primitives, shown in FIG. 13 as "flip_idx_and_wait( )" 68 and "srcu_readers_active_idx_check( )" 70, are additionally provided. Finally, there is also a modified version of the srcu_readers_active_idx( ) primitive (shown in FIG. 12). This modified primitive is shown in FIG. 13 as "srcu_readers_active_idx_new( )" 72.

The SRCU data update process is as follows: An updater performing an SRCU update invokes either synchronize_srcu_new( ) 62 or synchronize_srcu_expedited_new( ) 64 in order to schedule a grace period. Each of these functions calls synchronize_srcu_new( ) 66. The _synchronize_srcu_new( ) function 66 contains a call to flip_idx_and_wait( ) 68, which contains calls to srcu_readers_active_idx_check( ) 70, which itself calls srcu_readers_active_idx_new( ) 72. The foregoing call sequence is graphically illustrated in FIG. 13. Each of the various update-side primitives will now be discussed in detail.

Example C-language source code that may be used to implement synchronize_srcu_new( ) 62 and synchronize_srcu_expedited_new( ) 64 is respectively shown in FIGS. 18 and 19. These new wrapper functions call the new work function _synchronize_srcu_new( ) 66. As discussed below in connection with FIG. 20, this function takes a pointer to the srcu_struct_new data structure and a Boolean value called "expedited," indicating whether or not the requested synchronous grace period is expedited. The difference between synchronize_srcu_new( ) 62 and synchronize scru expedited 64 is that the former calls _synchronize_srcu_new( ) 66 with the Boolean value indicating a non-expedited synchronize grace period, while the latter calls _synchronize_srcu_new( ) with the Boolean value indicating an expedited synchronous grace period (see line 4 of FIGS. 18 and 19).

Figure 25:
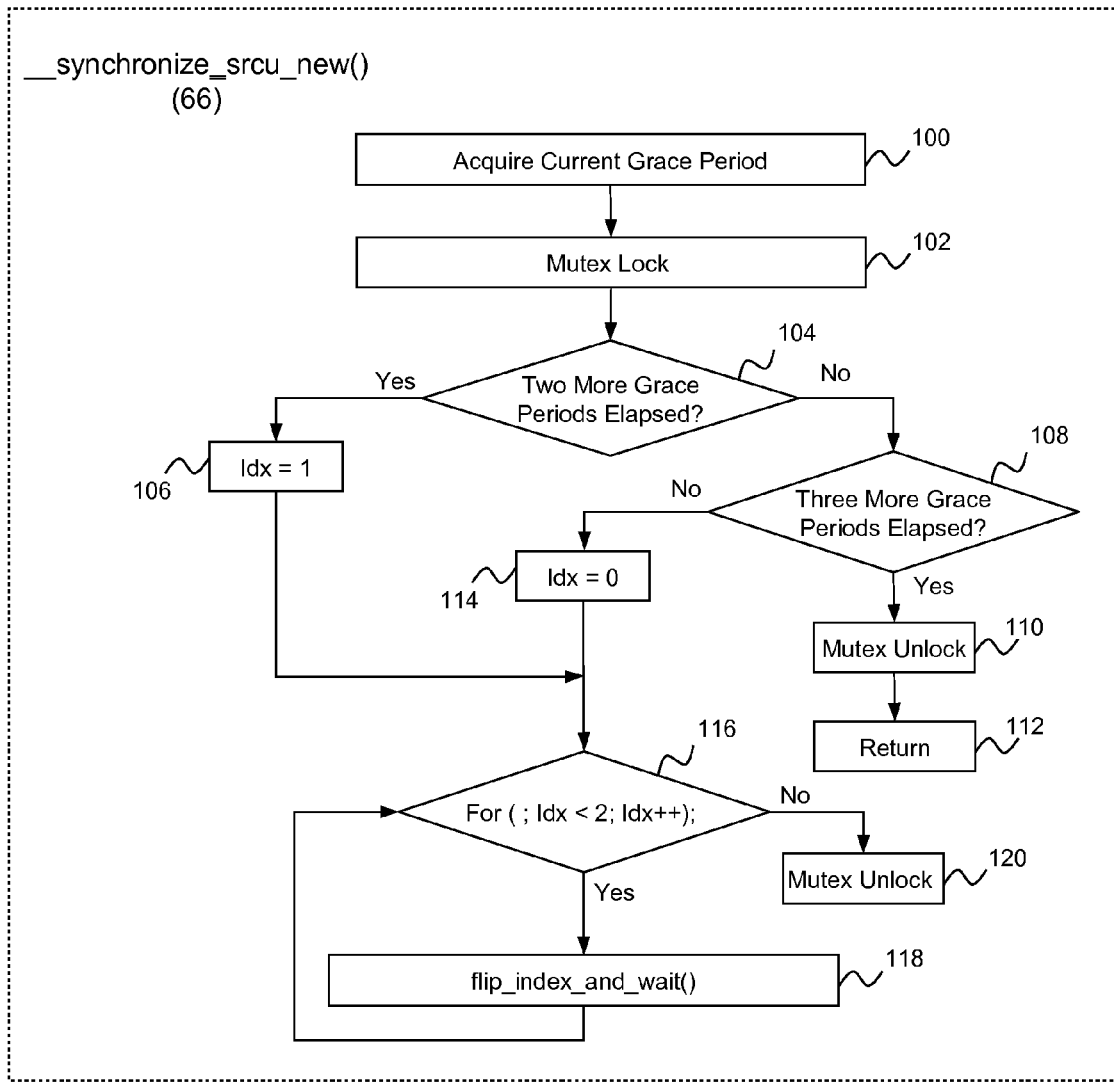
FIG. 25 is a flow diagram showing example operations of the _synchronize_srcu_new( ) primitive.

Example C-language source code that may be used to implement _synchronize_srcu_new( ) 66 is shown in FIG. 20. A corresponding flow diagram is shown in FIG. 25. Lines 5-13 (blocks 100-112 of FIG. 25) check to see if concurrent calls to _synchronize_srcu_new( ) 66 have done some or all of the required synchronous grace period detection work. Lines 14-15 (blocks 114-118 of FIG. 25) invoke flip_idx_and_wait( ) 68 up to two times in succession. As discussed in more detail below, calling flip_idx_and_wait( ) 68 twice avoids any problems arising from a long delay between srcu_read_lock_new( ) 58 acquiring the index 56 in lines 6-7 of FIG. 16 and the subsequent counter increment in lines 8-9.

Figure 26:
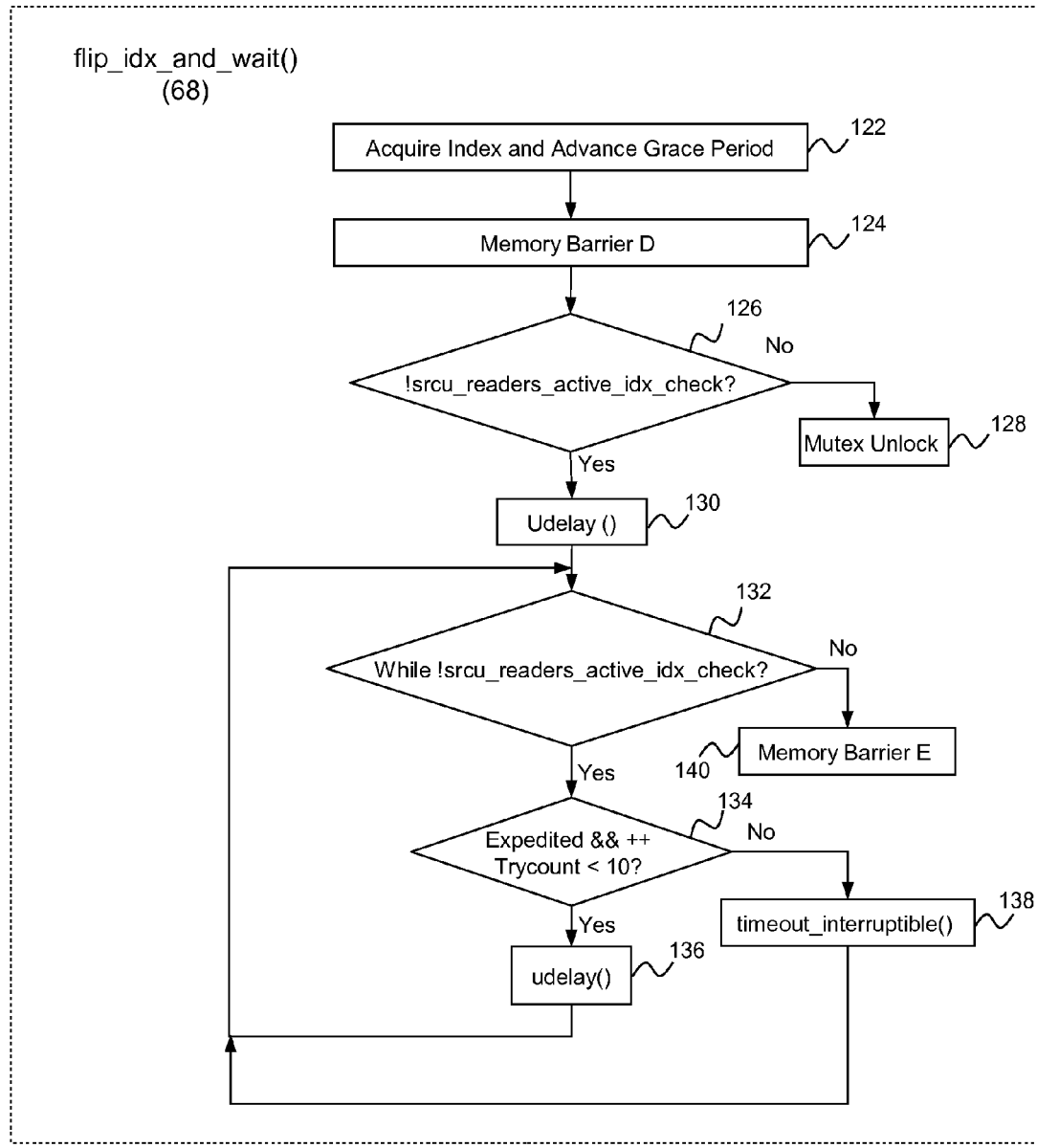
FIG. 26 is a flow diagram showing example operations of the flip_idx_and_wait( ) primitive.

Example C-language source code that may be used to implement flip_idx_and_wait( ) 68 is shown in FIG. 21. A corresponding flow diagram is shown in FIG. 26. Line 9 (block 122 of FIG. 26) accesses the srcu_struct_new data structure 40, extracts the bottom bit of the grace period counter 42 for use as the value of the index 56, then increments the grace period counter. Because the grace period counter 42 is incremented after extraction of the index 56, the index will have the same value used by pre-existing readers to manipulate one rank of the counters 52 or 54. New readers will extract the index value following the grace period counter increment, and will thus use the other rank of counters 52 or 54 in their execution of srcu_read_lock_new( ) 58 and srcu_read_unlock_new( ) 60. Line 10 (block 124 of FIG. 26) implements an smp_mb( ) memory barrier instruction that shall be referred to hereinafter as "memory barrier D." As mentioned in the previous paragraph, it is possible for a pre-existing reader to be delayed indefinitely between the time it fetches the index 56 at lines 6-7 of rcu_read_lock_new( ) 58 (see FIG. 16) and the time that it increments the counter at lines 8-9. The purpose of memory barrier D on line 10 of flip_idx_and_wait( ) 68 is to ensure that there can be only one additional srcu_read_lock_new( ) 58 per CPU accessing the old set of counters 52/54, as is discussed more fully below. This ensures that the check of the counters 52/54 is seen to follow the increment. In particular, if a second _srcu_read_lock( ) sees the old value of a counter 52/54, then memory barrier D pairs with either C or B to ensure that srcu_readers_active_check( ) sees the increment corresponding to the _first_srcu_read_lock( ) on the first iteration. This is desirable because only the two upper bits of the counters 52/54 are used as the operations counters 52A/54A. Thus, consider the effect of a pair of increments and a pair of decrements on a given critical section counter 52 or 54. Because each increment and decrement of a critical section counter 52B/54B also increments the corresponding operations counter 52A/54A by one (see lines 8-9 of FIG. 17 and lines 5-6 of FIG. 18), this would result in the CPU's operations counter 52A or 54A being incremented four times, and would leave the upper bits of the corresponding counter 52 or 54 in the same state that they started in.

Line 11 of flip _dx_and_wait( ) 68 (block 126 of FIG. 26) invokes srcu_readers_active_idx_check( ) 70 to see if all preexisting readers have completed, and if not, line 12 (block 130 of FIG. 26) executes a short delay, and the loop spanning lines 13-18 (blocks 132-138) repeatedly invokes srcu_readers_active_idx_check( ) 70 until it returns true, checking more frequently if the expedited flag is set. Finally, line 20 (block 140 of FIG. 26) implements an smp_mb( ) memory barrier instruction that shall be referred to hereinafter as "memory barrier E." Memory barrier E pairs with memory barrier C on line 4 of srcu_read_unlock_new( ) 60 in FIG. 17, ensuring that any subsequent destructive operations carried out by an SRCU updater happen after the SRCU reader's critical section has completed.

Figure 27:
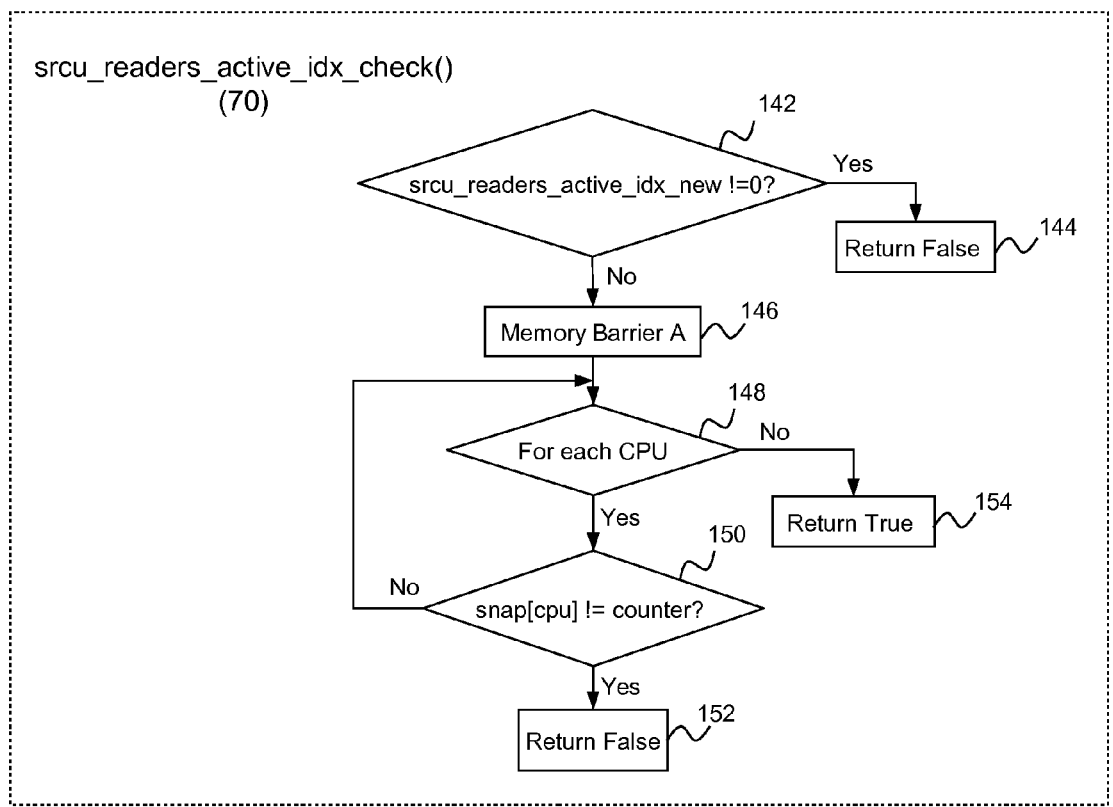
FIG. 27 is a flow diagram showing example operations of the srcu_readers_active_idx_check( ) primitive.
Figure 28:
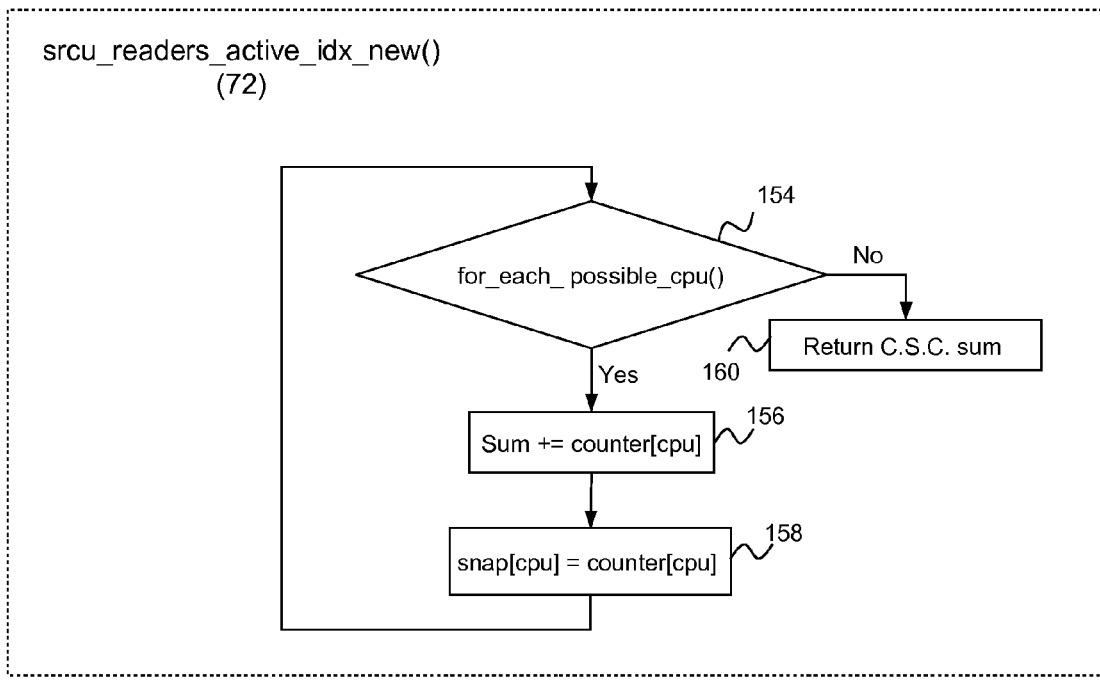
FIG. 28 is a flow diagram showing example operations of the srcu_readers_active_idx_new( ) primitive.

Example C-language source code that may be used to implement rcu_readers_active_idx_check( ) 70 is shown in FIG. 22. A corresponding flow diagram is shown in FIG. 27. This function returns false if there is a possibility that pre-existing readers are still executing within their SRCU read-side critical sections, and true if it can guarantee that all pre-existing readers have completed. Line 6 (block 142 of FIG. 27) invokes srcu_readers_active_idx_new( ) 72 to sum the critical section counters 52B or 52B associated with the current value of the index 56. FIG. 23 shows example C-language source code that may be used to implement srcu_readers_active_idx_new( ) 72. A corresponding flow diagram is shown in FIG. 28. The loop spanning lines 8-11 (blocks 154-156 of FIG. 28) represents the counter summation operation that scans all of the counters 52 or 54 for a given rank of counters. Line 8 (block 154 of FIG. 28) loops over all the CPUs (whether online or not). Line 9 obtains a pointer to the current CPU's counter 52 or 54. Line 10 (block 156 of FIG. 28) adds the counter value to the sum. Subsequently, in line 13 (block 160 of FIG. 28), the upper bits of the sum are masked off to obtain a value representing only the sum of the critical section counters 52B or 54B associated with the index 56, and returns this sum value to line 6 of srcu_readers_active_idx_check( ) 70 in FIG. 22. Because srcu_readers_active_idx_check( ) 70 cares only whether or not the sum is zero, this masking operation is harmless. Unfortunately, however, readers can be manipulating the counters concurrently with the execution of srcu_readers_active_idx_new( ) 72. This means that the sum can be inaccurate, as illustrated by the sequence of events called out earlier. Therefore, line 11 of FIG. 23 (block 158 of FIG. 28) also takes a snapshot of the values of the counters 52 or 54 at the time each was added to the sum, and assigns the snapshot value to the current CPU's element in the snapshot array 48 of the struct_srcu_new data structure 40. This allows the rcu_readers_active_idx_check( ) 70 to check for false zero readings on lines 9-11 of FIG. 22.

Returning now to FIG. 22, if the sum determined by srcu_readers_active_idx_new( ) 72 is non-zero, line 7 of srcu_readers_active_idx_check( ) 70 (block 144 of FIG. 27) returns false. Otherwise, line 8 (block 146 of FIG. 27) executes an smp_mb( ) memory barrier instruction that shall be referred to hereinafter as "memory barrier A." Following this, a recheck loop spanning lines 9-12 (blocks 148-150 of FIG. 27) scans all the CPUs, whether online or not, to test the validity of the counter summation being zeroed out. This loop embodies the recheck operation discussed in Observation 1 above. Lines 10 and 11 (block 150 of FIG. 27) check to see if any of the counters 52 or 54 has changed since the time that srcu_readers_active_idx_new( ) 72 summed them, and, if so, line 12 (block 152 of FIG. 27) returns false to indicate that readers might still be present. Otherwise, line 13 (block 154 of FIG. 27) returns true. Memory barrier A pairs with memory barriers B and C in srcu_read_lock_new( ) 58 and srcu_read_unlock_new( ) 60, respectively. This memory-barrier pairing ensures that if srcu_readers_active_idx_new( ) 72 in FIG. 23 saw a counter decrement from srcu_read_unlock_new( ) 60, then the check loop on lines 9-12 of FIG. 22 must also see the increment from the corresponding srcu_read_lock_new( ) 58. Therefore, if srcu_readers_active_idx_new( ) 72 in FIG. 23 missed an srcu_read_lock_new( ) counter increment but saw the corresponding srcu_read_unlock_new( ) 60 counter decrement, which is the scenario that can cause srcu_readers_active_idx_new( ) to incorrectly report a reader count of zero, the recheck operation on lines 9-12 of FIG. 22 is guaranteed to see the change in the value of the critical section counter 52B or 54B that srcu_read_lock_new( ) 58 incremented.

It may now be seen how the foregoing code guarantees that Observation 1 is implemented. Consider again the above-described Problem Example, but with a new step 7, representing the recheck operation, being added, and also using the srcu_struct_new data structure 40:

1. Task A is in a long-running SRCU read-side critical section that started on CPU 1. Task A is the only SRCU reader in the system, such that CPU 1's critical section counter 52 or 54 for the index 56 determined when CPU 1 entered its critical section sum will have a value of +1.
2. Task B starts executing srcu_read_lock( ) on CPU 0, fetching the value of the grace period counter 42 in srcu_struct_new 40 and extracting the bottom bit to use as the index 56, but not yet incrementing the corresponding critical section counter 52 or 54.
3. Task C begins executing synchronize_srcu( ) or synchronize_srcu_expedited( ) It therefore increments the grace period counter 42 and starts summing and taking snapshots of the critical section counters 52 or 54 for the index 56 associated with the grace period counter's pre-incremented value. It is assumed that this is the same index value that was extracted by Tasks A and B during their srcu_read_lock( ) operations. After summing and taking snapshots of CPU 0's and CPU 1's critical section counters, Task C is delayed. Since Task B did not yet increment its critical section counter 52 or 54 on CPU 0 before Task C's summation/snapshot operation, the critical section counter sum will be +1 to reflect only Task A's increment on CPU 1. CPU 0's snapshot will reflect a critical section counter value of 0. CPU 1's snapshot will reflect a critical section counter value of +1. These snapshot values are stored in the snapshot array 48.
4. Task B continues executing in srcu_read_lock( ) on CPU 0, using the now-obsolete index 56 to increment the associated critical section counter 52 or 54 for CPU 0 to a value of +1.
5. Task B is migrated to CPU 2, where it decrements the critical section counter 52 or 54 associated with the old index 56 to a value of −1.
6. Task C continues in synchronize_srcu( ) summing and taking snapshots of the remainder of the counters, including that of CPU 2. Task C will see Task B's critical section counter decrement on CPU 2 but not its increment on CPU 0. Task C therefore arrives at a critical section counter sum of zero (+1 on CPU 1 and −1 on CPU 2) instead of the correct sum of +1 (to account for CPU 0). This could cause Task C to conclude that the grace period has completed, despite the fact that Task A is still in its pre-existing SRCU read-side critical section. CPU 2's snapshot will reflect a critical section counter value of −1. This snapshot value is stored in the snapshot array 48.
7. Task C performs a recheck operation that compares the current counter value for each CPU with the snapshot value taken during steps 3 and 6. The recheck operation will discover the following:
CPU 0—current critical section counter value=+1, snapshot value=0;
CPU 1—current critical section counter value=+1, snapshot value=+1;
CPU 2—current critical section counter value=−1, snapshot value=−1.

For CPU 0, the previously undetected counter increment to +1 in step 4 will now be seen. A false zero reading indication will be returned, thereby preventing premature grace period ending.

As noted in Observation 2, the recheck operation may not detect a false zero summation in certain cases where there is a counter increment followed by a counter decrement, and the counter increment is not seen due to memory reordering. As discussed, this scenario is addressed by the splitting the bits of the counters 52 and 54 into separate operations counters 52A/54A and critical section counters 52B/54B, and by having srcu_read_lock_new( ) and srcu_read_unlock_new( ) increment one of the operations counters 52A or 54A each time they respectively increment or decrement the corresponding critical section counter 52B or 54B.

To see how splitting the counters 52 and 54 implements Observation 2, consider again the above-described Problem Example, but using the operations counters 52A and 54B, and with steps 5.5 and step 7 being added:

1. Task A is in a long-running SRCU read-side critical section that started on CPU 1. Task A is the only SRCU reader in the system. CPU 1's counter 32 or 34 for the index 56 determined when Task A entered its critical section will reflect an operations counter value of +1 and a critical section counter value of +1.
2. Task B starts executing srcu_read_lock( ) on CPU 0, fetching the value of the grace period counter 42 in srcu_struct 22 and extracting the bottom bit to use as the index 56, but not yet incrementing the corresponding counter 52 or 54.
3. Task C begins executing synchronize_srcu( ) or synchronize_srcu_expedited( ) and therefore increments the grace period counter 42 and starts summing and taking snapshots of the critical section counters 52 or 54 for the index 56 associated with the grace period counter's pre-incremented value. It is assumed that this is the same index value that was extracted by Tasks A and B during their srcu_read_lock( ) operations. After summing and taking snapshots of CPU 0's and CPU 1's critical section counters, Task C is delayed. Since Task B did not yet increment its critical section counter 52 or 54 on CPU 0 before Task C's summation and snapshot operation, the counter sum will be +1 to reflect only Task A's increment on CPU 1. CPU 0's snapshot will reflect an operations counter value of 0 and a critical section counter value of 0. CPU 1's snapshot will reflect an operations counter value of +1 and a critical section counter value of +1. These snapshot values are stored in the snapshot array 48.
4. Task B resumes executing in srcu_read_lock( ) on CPU 0, using the now-obsolete index 56 to manipulate the associated counter 52 or 54 for CPU 0 to reflect an operations counter value of +1 and a critical section counter value of +1.
5. Task B is migrated to CPU 2, where it manipulates the counter 52 or 54 associated with the old index 56 to reflect an operations counter value of +1 and a critical section counter value of −1.
5.5 Task D, having previously acquired the same index value used by Tasks A and B, executes srcu_read_lock( ) on CPU 1, performing a counter manipulation to increment CPU 1's operations counter 52A or 54A to a value of +2, and to increment CPU 1's critical section counter 52B or 54B to a value of +2. Task D then immediately ends its SRCU read-side critical section on CPU 0, performing a counter manipulation to increment CPU 0's operations counter 52A or 54A to a value of +2, and to decrement CPU 0's critical section counter 52B or 54B to a value of 0. Due to memory reordering, Task C is able to see Task D's critical section exit, but not its entry.

6. Task C continues in synchronize_srcu( ) summing and taking snapshots of the remainder of the counters, including that of CPU 2. Task C will see Task B's critical section counter decrement on CPU 2 but not its increment on CPU 0. Nor will task C see Task D's critical section counter increment on CPU 1 or its decrement on CPU 0. Task C therefore arrives at a critical section counter sum of zero (+1 on CPU 1 and −1 on CPU 2) instead of the correct sum of +1 (to account for CPU 0). This could cause Task C to conclude that the grace period has completed, despite the fact that Task A is still in its pre-existing SRCU read-side critical section. CPU 2's snapshot will reflect an operations counter value of +1 and a critical section counter value of −1. These snapshot values are stored in the snapshot array 48.

7. Task C performs a recheck operation that compares the current counter value for each CPU with the snapshot value taken during steps 3 and 6. The recheck operation will discover the following:

CPU 0—current operations counter value=+2, current critical section counter value=0, snapshot operations counter value=0, snapshot critical section counter value=0;

CPU 1—current operations counter value=+1, current critical section counter value=+1, snapshot operations counter value=+1, snapshot critical section counter value=+1;

CPU 2—current operations counter value=+1, current critical section counter value=−1, snapshot operations counter value=+1, snapshot critical section counter value=−1.

Due to Task C not seeing Task D's counter manipulation on CPU 1, during the recheck operation, the critical section counter decrement by Task D on CPU 0 in step 5.5 will pair with the critical section counter increment by Task B on CPU 0 in step 2. Without the operations counters 52A or 54A, the recheck operation would have itself falsely concluded that the counter sum is zero. However, using the operations counter 52A or 54A, Task C will detect a mismatch between the current and snapshot values of the operations counter 52A or 54A on CPU 0. The previously undetected counter increment to +1 on CPU 0 in step 4 will now be seen. A false zero reading indication will be returned, thereby preventing premature grace period ending.

Turning now to Observation 3, it may now be seen how the foregoing code guarantees that at most one srcu_read_lock_new( ) 58 per CPU will use the old rank of the counters 52 or 54 after the summation/snapshot operation of srcu_readers_active_idx_new( ) 72 is performed. If a reader's srcu_read_lock_new( ) 58 increments its counter 52 or 54 after srcu_readers_active_idx_new( ) 72 reads it, memory barrier D in flip_idx_and_wait( ) 68 (FIG. 21) will pair with memory barrier B in srcu_read_lock_new( ) 58 (FIG. 16) to guarantee that the reader's next invocation of srcu_read_lock_new( ) (whether nested or not) will access the new value of the grace period counter 42 to extract a new value of the index 56. Therefore, a given CPU can increment its old counter at most once after srcu_readers_active_idx_new( ) 72 has read that same counter. This prevents the double-increment scenario that can wrap the operations counters 52A/54A, and ensures that the only way for the counters 52 or 54 to wrap is for a given CPU to execute a very large number of srcu_read_unlock_new( ) invocations (incrementing a critical section counter on each invocation) before the grace period counter 42 was incremented.

On 64-bit systems, $2^{62}$ increment operations would be required, or more than $10^{18}$, which would require more than a century to execute, even if they executed back-to-back, one every nanosecond. On 32-bit systems, consider that each task has 4K of memory for its stack. This means that at most $2^{20}$ tasks can exist on a 32-bit system. If it is assumed that SRCU read-side critical sections are never nested more than 1,000 deep for any given srcu_struct_new data structure 40, then it is not possible for a CPU to wrap its counters 52 or 54 based on pre-existing SRCU read-side critical sections (bearing in mind that all but one new SRCU read-side critical section will use the other counter of the set).

One additional scenario not previously discussed is that a task is delayed so long within srcu_read_lock_new( ) 58, between fetching the grace period counter 42 in line 6 of FIG. 16 and incrementing one of the counters 52 or 54 in lines 8-9, that srcu_readers_active_idx_check( ) 70 in FIG. 22 has already returned true before the increment occurs. This is not a problem for the current grace period because the corresponding SRCU read-side critical section will start after synchronize_srcu_new( ) (or synchronize_srcu_expedited_new( ) as the case may be) has started, so there is no requirement that the SRCU grace period wait for that reader. However, this is not true for a subsequent SRCU grace period, which unfortunately will be waiting for the other set of counters to drain, and thus might fail to wait for the pre-existing SRCU read-side critical section. This issue is handled within synchronize_srcu_new( ) 66 (FIG. 20) by the simple expedient of invoking flip_idx_and_wait( ) 68 twice.

Accordingly, a technique has been disclosed for implementing sleepable read-copy update with reduced OS jitter. It will be appreciated that the foregoing concepts may be variously embodied in any of a data processing system, a machine implemented method, and a computer program product in which programming logic is provided by one or more machine-useable data storage media for use in controlling a data processing system to perform the required functions. Example embodiments of a data processing system and machine implemented method were previously described in connection with FIG. 4-28. With respect to a computer program product, digitally encoded program instructions may be stored on one or more computer-readable data storage media for use in controlling a computer or other digital machine or device to perform the required functions. The program instructions may be embodied as machine language code that is ready for loading and execution by the machine apparatus, or the program instructions may comprise a higher level language that can be assembled, compiled or interpreted into machine language. Example languages include, but are not limited to C, C++, assembly, to name but a few. When implemented on a machine comprising a processor, the program instructions combine with the processor to provide a particular machine that operates analogously to specific logic circuits, which themselves could be used to implement the disclosed subject matter.

Figure 29:
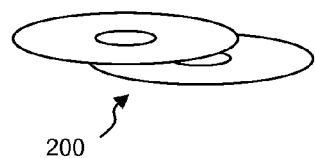
FIG. 29 is a diagrammatic illustration showing media that may be used to provide a computer program product for implementing the technique disclosed herein.

Example data storage media for storing such program instructions are shown by reference numerals 8 (memory) and 10 (cache) of the computer system 2 of FIG. 4. The system 2 may further include one or more secondary (or tertiary) storage devices (not shown) that could store the program instructions between system reboots. A further example of data storage media that may be used to store the program instructions is shown by reference numeral 200 in FIG. 29. The storage media 200 are illustrated as being portable optical storage disks of the type that are conventionally used for commercial software sales, such as compact disk-read only memory (CD-ROM) disks, compact disk-read/write (CD-R/W) disks, and digital versatile disks (DVDs). Such storage media can store the program instructions either alone or in conjunction with an operating system or other software product that incorporates the required functionality. The storage media could also be provided by other portable storage media (such as floppy disks, flash memory sticks, etc.), or storage media combined with drive systems (e.g. disk drives). As is the case with the memory 8 and the cache 10 of FIG. 4, the storage media may be incorporated in data processing platforms that have integrated random access memory (RAM), read-only memory (ROM) or other semiconductor or solid state memory. More broadly, the storage media could comprise any electronic, magnetic, optical, infrared, semiconductor system or apparatus or device, or any other tangible entity representing a machine, manufacture or composition of matter that can contain, store, communicate, or transport the program instructions for use by or in connection with an instruction execution system, apparatus or device, such as a computer. For all of the above forms of storage media, when the program instructions are loaded into and executed by an instruction execution system, apparatus or device, the resultant programmed system, apparatus or device becomes a particular machine for practicing embodiments of the method(s) and system(s) described herein.

Although various example embodiments have been shown and described, it should be apparent that many variations and alternative embodiments could be implemented in accordance with the disclosure. It is understood, therefore, that the invention is not to be in any way limited except in accordance with the spirit of the appended claims and their equivalents.

What is claimed is:

1. A method for implementing SRCU with reduced OS jitter in a system having plural CPUs capable of executing concurrent readers and updaters of shared data, comprising:
   providing a pair of critical section counters for each CPU, one critical section counter of each critical section counter pair being associated with a first grace period and the other critical section counter of each critical section counter pair being associated with a second grace period;
   when entering an SRCU read-side critical section involving reading said shared data, incrementing one of said critical section counters associated with said first grace period;
   when exiting an SRCU read-side critical section involving reading said shared data, decrementing one of said critical section counters associated with said first grace period;
   when updating said shared data, initiating said second grace period and performing a counter summation operation that sums said critical section counters associated with said first grace period to generate a critical section counter sum;
   storing a snapshot value for each of said critical section counters during said summing; and
   if said critical section counter sum reaches a value indicating there are no SRCU read-side critical sections in progress for said first grace period, performing a recheck operation that compares said snapshot values to current values of said critical section counters associated with said first grace period to verify that said critical section counter sum is correct.

2. The method of claim 1, further including:
   implementing a first memory barrier instruction following incrementing one of said critical section counters when entering an SRCU read-side critical section;
   implementing a second memory barrier instruction preceding decrementing one of said critical section counters when exiting an SRCU read-side critical section; and
   implementing a third memory barrier instruction following said counter summation operation and prior to said recheck operation when updating said shared data.

3. The method of claim 2, further including:
   providing a pair of operations counters for each CPU, one operations counter of each operations counter pair being associated with a first grace period and the other operations counter of each operations counter pair being associated with a second grace period;
   when entering or exiting an SRCU read-side critical section involving reading said shared data, incrementing one of said operations counters associated with said first grace period;
   said storing a snapshot value for each of said critical section counters during said summing including storing a snapshot of said operations counters; and
   said recheck operation compares said snapshot values to current values of said critical section counters and said operations counters associated with said first grace period.

4. The method of claim 3, wherein said critical section counters and said operations counters are provided by counters that each include a critical section portion and an operations counter portion.

5. The method of claim 4, wherein said critical section portion comprises lower bits of said counters and said operations counter portion comprises upper bits of said counters.

6. The method of claim 5, further including:
   implementing a fourth memory barrier instruction following initiating said second grace period; and
   implementing a fifth memory barrier instruction following said recheck operation verifying that said critical section counter sum is correct.

7. A system, comprising:
   plural CPUs capable of executing concurrent readers and updaters of shared data;
   a memory coupled to said CPUs, said memory including a non-transitory computer useable medium tangibly embodying at least one program of instructions executable by said one or more CPUs to perform operations for implementing SRCU with reduced OS jitter, said operations comprising:
   providing a pair of critical section counters for each CPU, one critical section counter of each critical section counter pair being associated with a first grace period and the other critical section counter of each critical section counter pair being associated with a second grace period;
   when entering an SRCU read-side critical section involving reading said shared data, incrementing one of said critical section counters associated with said first grace period;
   when exiting an SRCU read-side critical section involving reading said shared data, decrementing one of said critical section counters associated with said first grace period;

when updating said shared data, initiating said second grace period and performing a counter summation operation that sums said critical section counters associated with said first grace period to generate a critical section counter sum;

storing a snapshot value for each of said critical section counters during said summing; and if said critical section counter sum reaches a value indicating there are no SRCU read-side critical sections in progress for said first grace period, performing a recheck operation that compares said snapshot values to current values of said critical section counters associated with said first grace period to verify that said critical section counter sum is correct.

8. The system of claim 7, wherein said operations further include:

implementing a first memory barrier instruction following incrementing one of said critical section counters when entering an SRCU read-side critical section;

implementing a second memory barrier instruction preceding decrementing one of said critical section counters when exiting an SRCU read-side critical section; and implementing a third memory barrier instruction following said counter summation operation and prior to said recheck operation when updating said shared data.

9. The system of claim 8, wherein said operations further include:

providing a pair of operations counters for each CPU, one operations counter of each operations counter pair being associated with a first grace period and the other operations counter of each operations counter pair being associated with a second grace period;

when entering or exiting an SRCU read-side critical section involving reading said shared data, incrementing one of said operations counters associated with said first grace period;

said storing a snapshot value for each of said critical section counters during said summing including storing a snapshot of said operations counters; and said recheck operation compares said snapshot values to current values of said critical section counters and said operations counters associated with said first grace period.

10. The system of claim 9, wherein said critical section counters and said operations counters are provided by counters that each include a critical section portion and an operations counter portion.

11. The system of claim 10, wherein said critical section portion comprises lower bits of said counters and said operations counter portion comprises upper bits of said counters.

12. The system of claim 11, wherein said operations further include:

implementing a fourth memory barrier instruction following initiating said second grace period; and implementing a fifth memory barrier instruction following said recheck operation verifying that said critical section counter sum is correct.

13. A computer program product, comprising:

one or more non-transitory machine-useable storage media;

program instructions stored on said one or more storage media and executable by plural CPUs capable of executing concurrent readers and updaters of shared data to perform operations for implementing SRCU with reduced OS jitter, said operations comprising:

providing a pair of critical section counters for each CPU, one critical section counter of each critical section counter pair being associated with a first grace period and the other critical section counter of each critical section counter pair being associated with a second grace period;

when entering an SRCU read-side critical section involving reading said shared data, incrementing one of said critical section counters associated with said first grace period;

when exiting an SRCU read-side critical section involving reading said shared data, decrementing one of said critical section counters associated with said first grace period;

when updating said shared data, initiating said second grace period and performing a counter summation operation that sums said critical section counters associated with said first grace period to generate a critical section counter sum;

storing a snapshot value for each of said critical section counters during said summing; and if said critical section counter sum reaches a value indicating there are no SRCU read-side critical sections in progress for said first grace period, performing a recheck operation that compares said snapshot values to current values of said critical section counters associated with said first grace period to verify that said critical section counter sum is correct.

14. The computer program product of claim 13, wherein said operations further include:

implementing a first memory barrier instruction following incrementing one of said critical section counters when entering an SRCU read-side critical section;

implementing a second memory barrier instruction preceding decrementing one of said critical section counters when exiting an SRCU read-side critical section; and implementing a third memory barrier instruction following said counter summation operation and prior to said recheck operation when updating said shared data.

15. The computer program product of claim 14, wherein said operations further include:

providing a pair of operations counters for each CPU, one operations counter of each operations counter pair being associated with a first grace period and the other operations counter of each operations counter pair being associated with a second grace period;

when entering or exiting an SRCU read-side critical section involving reading said shared data, incrementing one of said operations counters associated with said first grace period;

said storing a snapshot value for each of said critical section counters during said summing including storing a snapshot of said operations counters; and said recheck operation compares said snapshot values to current values of said critical section counters and said operations counters associated with said first grace period.

16. The computer program product of claim 15, wherein said critical section counters and said operations counters are provided by counters that each include a critical section portion and an operations counter portion.

17. The computer program product of claim 16, wherein said critical section portion comprises lower bits of said counters and said operations counter portion comprises upper bits of said counters.

18. The computer program product of claim 17, wherein said operations further include:

implementing a fourth memory barrier instruction following initiating said second grace period; and implementing a fifth memory barrier instruction following said recheck operation verifying that said critical section counter sum is correct.

19. A method for implementing SRCU with reduced OS jitter in a system having plural CPUs capable of executing concurrent readers and updaters of shared data, comprising:
provuding a pair of counters for each CPU, one counter of each counter pair being associated with a first grace period and the other counter of each counter pair being associated with a second grace period;
each said counter comprising a critical section counter portion and an operations counter portion;
when entering an SRCU read-side critical section involving reading said shared data, performing a critical section entry counter manipulation that increments a critical section counter portion and increments an operations counter portion of one of said counters associated with said first grace period;
implementing a first memory barrier instruction following said critical section entry counter manipulation;
when exiting an SRCU read-side critical section involving reading said shared data, performing a critical section exit counter manipulation that decrements a critical section counter portion and increments an operations counter portion of one of said counters associated with said first grace period;
implementing a second memory barrier instruction preceding said critical section exit counter manipulation;
when updating said shared data, initiating said second grace period and performing a counter summation operation that sums said counters associated with said first grace period to generate a counter sum;
implementing a third memory barrier instruction following initiating said second grace period;
storing a snapshot value for each of said counters during said summing;
extracting a critical section counter sum from said counter sum;
if said critical section counter sum reaches a value indicating there are no SRCU read-side critical sections in progress for said first grace period, performing a recheck operation that compares said snapshot values to current values of said counters associated with said first grace period to verify that said critical section counter sum is correct;
implementing a fourth memory barrier instruction following said counter summation operation and prior to said recheck operation when updating said shared data; and
implementing a fifth memory barrier instruction following said recheck operation verifying that said critical section counter sum is correct.

20. The method of claim 19, wherein said critical section portion comprises lower bits of said counters and said operations counter portion comprises upper bits of said counters.

* * * * *